(12) United States Patent
Tsuruoka

(10) Patent No.: US 7,339,619 B2
(45) Date of Patent: Mar. 4, 2008

(54) IMAGE PICKUP SYSTEM AND IMAGE PROCESSING PROGRAM FOR PERFORMING CORRECTION ON CHROMA SIGNAL

(75) Inventor: Takao Tsuruoka, Machida (JP)

(73) Assignee: Olympus Corporation, Tokyo (JP)

( * ) Notice: Subject to any disclaimer, the term of this patent is extended or adjusted under 35 U.S.C. 154(b) by 852 days.

(21) Appl. No.: 10/817,315

(22) Filed: Apr. 2, 2004

(65) Prior Publication Data

US 2004/0218075 A1    Nov. 4, 2004

(30) Foreign Application Priority Data

Apr. 8, 2003    (JP)    ............................. 2003-104485

(51) Int. Cl.
*H04N 9/68* (2006.01)
*H04N 17/02* (2006.01)

(52) U.S. Cl. ...................... 348/234; 348/182; 348/577; 348/652; 358/520; 358/518; 382/237; 382/270

(58) Field of Classification Search ................ 348/234, 348/182
See application file for complete search history.

(56) References Cited

U.S. PATENT DOCUMENTS

| 4,831,434 | A | | 5/1989 | Fuchsberger |
| 5,384,601 | A | * | 1/1995 | Yamashita et al. .......... 348/577 |
| 5,434,683 | A | * | 7/1995 | Sekine et al. ............... 358/520 |
| 5,467,438 | A | | 11/1995 | Nishio et al. |
| 5,748,785 | A | * | 5/1998 | Mantell et al. ............. 382/237 |
| 6,975,437 | B2 | * | 12/2005 | Takemoto ................... 358/518 |
| 2003/0020736 | A1 | | 1/2003 | Kimura et al. |
| 2003/0053689 | A1 | | 3/2003 | Watanabe et al. |
| 2003/0058349 | A1 | * | 3/2003 | Takemoto ................. 348/222.1 |
| 2004/0017380 | A1 | * | 1/2004 | Kim et al. ................... 345/600 |

FOREIGN PATENT DOCUMENTS

| DE | 3629 403 A1 | 8/1988 |
| EP | 0 423 653 A2 | 4/1991 |
| EP | 1 289 315 A2 | 3/2003 |
| JP | 63-59292 A | 3/1988 |
| JP | 03-127278 A | 5/1991 |
| JP | 2567214 B2 | 10/1996 |
| JP | 3190050 B2 | 5/2001 |
| JP | 2001-238129 A | 8/2001 |
| JP | 2002-140700 A | 5/2002 |
| JP | 2003-047020 A | 2/2003 |
| JP | 2003-069846 A | 3/2003 |

* cited by examiner

*Primary Examiner*—Lin Ye
*Assistant Examiner*—Hung H. Lam
(74) *Attorney, Agent, or Firm*—Frishauf, Holtz, Goodman & Chick, P.C.

(57) ABSTRACT

A color signal of a primary color or a color signal of a complementary color is converted from a CCD to signals in a color space having an intensity, a hue and a chroma. Tone conversion is performed on a luminance signal. A chroma correction coefficient is calculated to be used for performing correction on a chroma signal. A first maximum chroma value is calculated with respect to the luminance signal and a hue signal and a second maximum chroma value is calculated with respect to the hue signal and the converted luminance signal. And a correction coefficient is calculated based on the first and second maximum chroma values and the chroma signal is corrected based on the correction coefficient and the chroma correction coefficient.

35 Claims, 12 Drawing Sheets

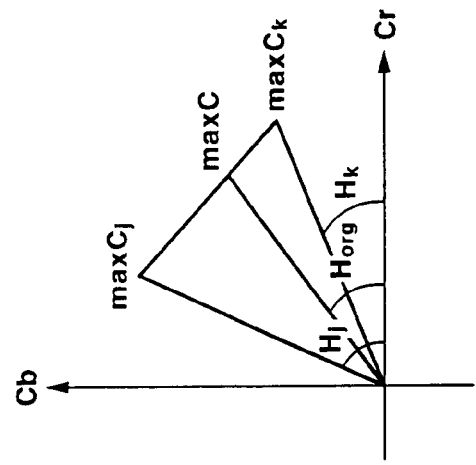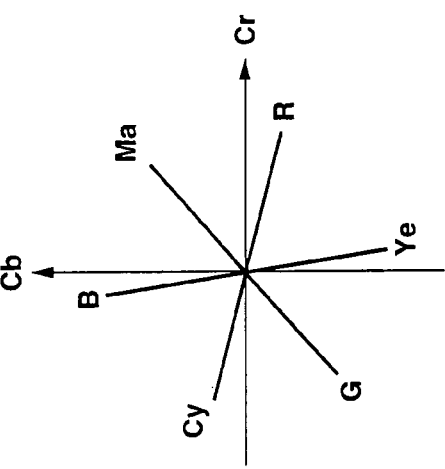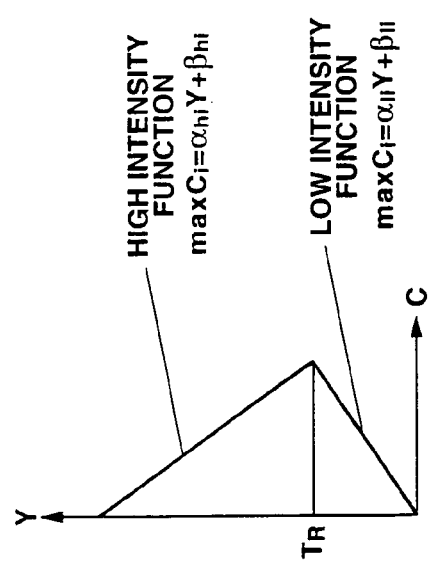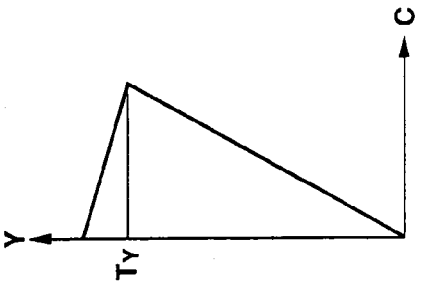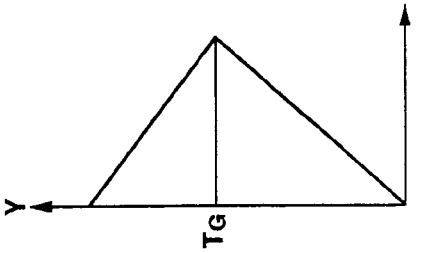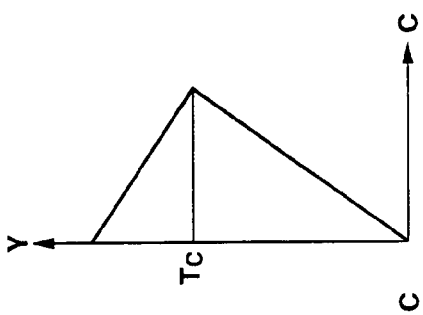
FIG.4A FIG.4B FIG.4C FIG.4D FIG.4E FIG.4F FIG.4G FIG.4H

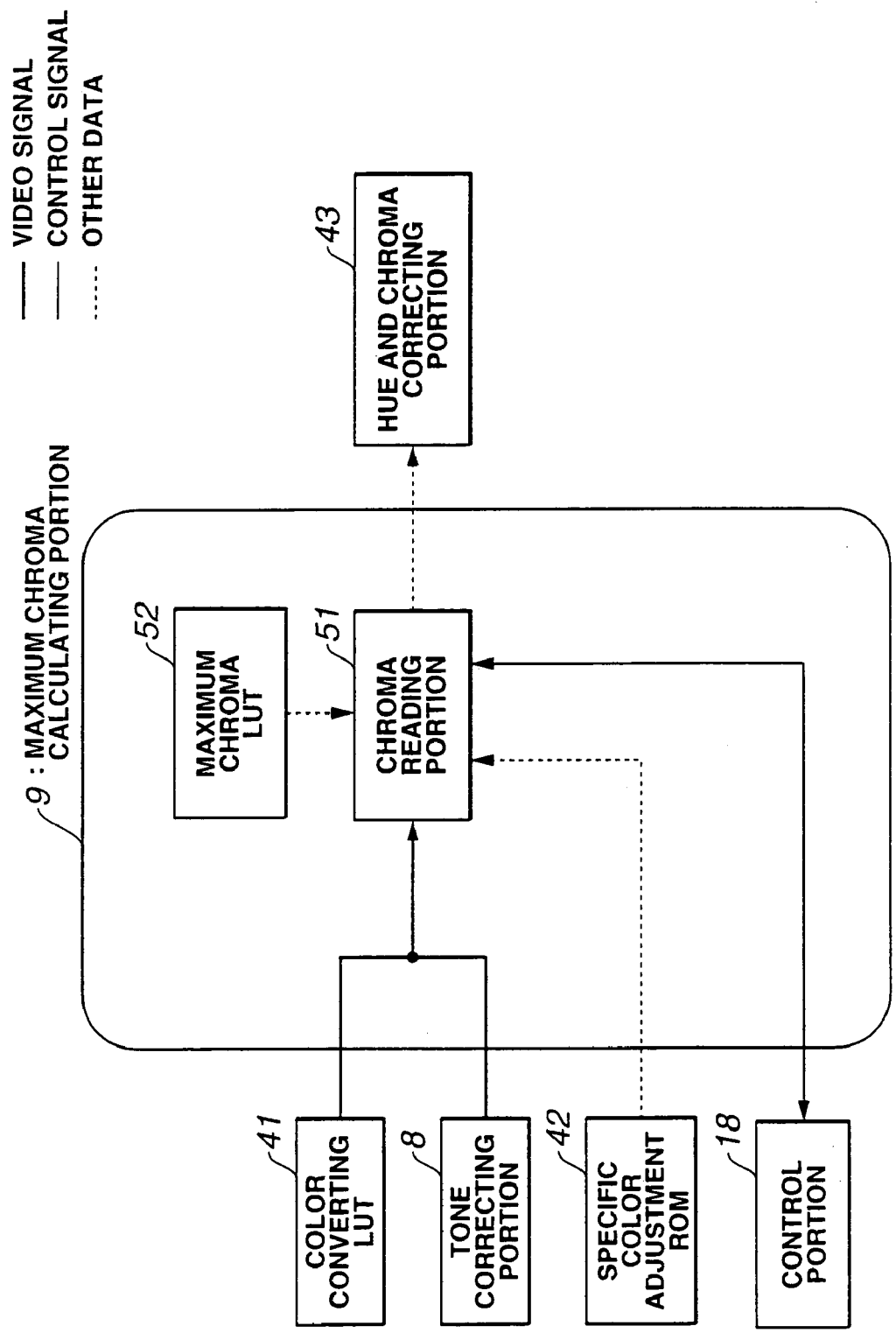

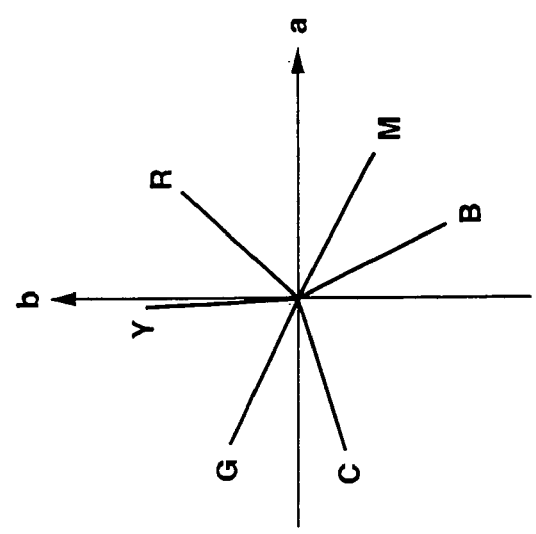
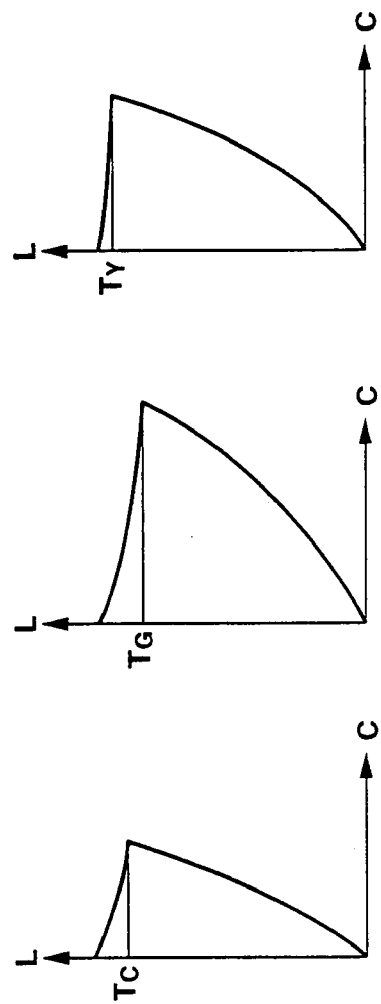
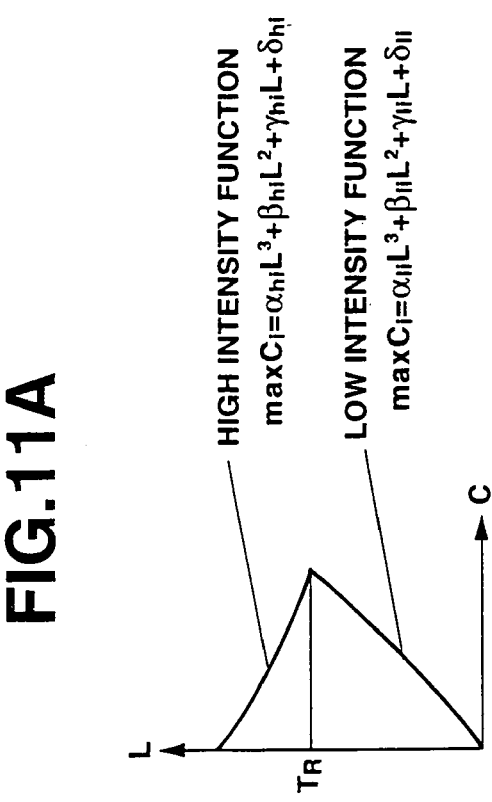
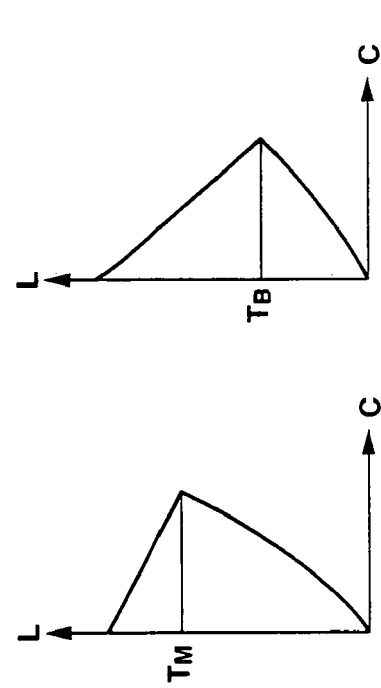
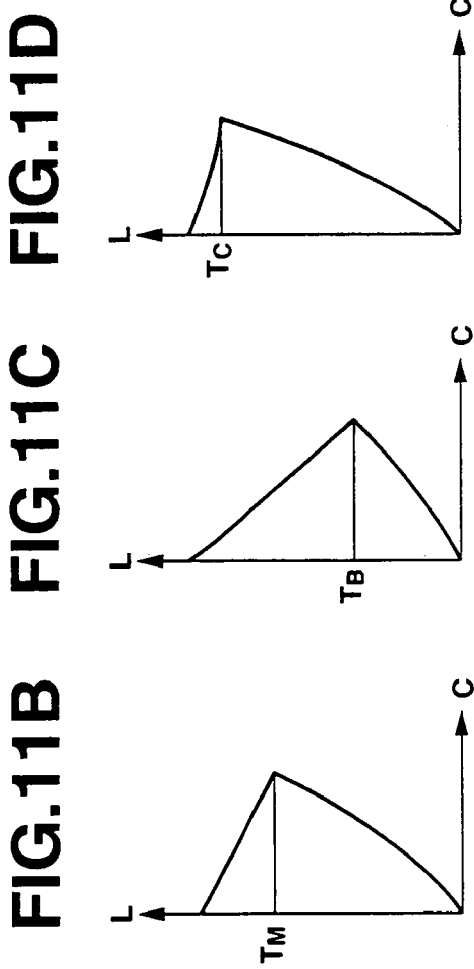

IMAGE PICKUP SYSTEM AND IMAGE PROCESSING PROGRAM FOR PERFORMING CORRECTION ON CHROMA SIGNAL

This application claims benefit of Japanese Applications No. 2003-104485 filed in Japan on Apr. 8, 2003, the contents of which are incorporated by this reference.

BACKGROUND OF THE INVENTION

1. Field of the Invention

The present invention relates to color signal processing for color video signals and, in particular, to an image pickup system and image processing program for obtaining high quality video signals by correcting chroma signals in accordance with a tone conversion of luminance signals.

2. Description of Related Art

The main stream of current image pickup systems such as digital still cameras and video cameras uses a single plate CCD having a complementary color filter or a primary-color filter on the front side.

In this kind of image pickup system, white-balance (WB) processing and/or interpolation processing are performed on color signals from a CCD. Then, picture creating processing such as edge emphasizing processing, chroma emphasizing processing and tone correcting processing is performed thereon, and the result is output.

The resulting signals may further undergo chroma-suppress processing, highlight cyan processing and so on. The chroma-suppress processing is performed for reducing a false color, which may occur at the edge, in the interpolating processing. The highlight cyan processing is performed for reducing a false color, which may occur at a part having a high intensity due to a difference in spectral sensitivity characteristic of a CCD.

The picture-creating processing as described above may be directly performed on color signals from a CCD. However, in general, a color signal is converted into a different color space and is separated into a luminance signal and color signals to undergo the processing thereafter. In this case, the color signals may deviate from a gamut due to the chroma emphasizing processing, for example, or the color signals may become unnatural when only the luminance signal is tone-converted, which are problems and need some solutions.

In order to solve the problem of the Gamut deviation, Japanese Patent No. 2567214, for example, discloses processing for obtaining a chroma histogram for each hue and compressing the entire form of the histogram such that the histogram can fit in a gamut.

Also, Japanese Patent No. 3190050 discloses processing for compressing a chroma for each hue toward the origin point so as to fit in a gamut.

On the other hand, in order to solve the problem that color signals become unnatural, Japanese Unexamined Patent Application Publication No. 2001-238129, for example, discloses a technology for correcting color signals so as to provide a fixed ratio for a theoretical characteristic value of a gamut when a luminance signal is changed.

When the technology for compressing the entire form of a histogram as disclosed in Japanese Patent No. 2567214 and/or the technology for compressing a chroma toward the origin point as disclosed in Japanese Patent No. 3190050 is used, the image does not deviate from the gamut as a whole. However, the color reproduction after the processing depends on the image to be processed. Thus, the picture creating processing intended for chroma emphasis and so on is not reflected thereon, and the control of the color reproduction becomes difficult, which is another problem.

By using the technology for providing a fixed ratio for a theoretical characteristic value of a gamut as disclosed in Japanese Unexamined Patent Application Publication No. 2001-238129, natural color reproduction can be achieved. However, the amount of calculation is large, and as the length of the processing time increases, the cost of the entire apparatus increases, which is another problem.

SUMMARY OF THE INVENTION

It is an object of the present invention to provide an image pickup system and image processing program which can provide natural color reproduction and can easily control color reproduction.

It is another object of the present invention to provide an image pickup system and image processing program which can perform fast processing with a small amount of calculation at low cost.

Briefly, according to an aspect of the present invention, there is provided an image pickup system for tone converting and outputting a color signal of a primary color or a color signal of a complementary color from an image pickup apparatus, the system including color space converting means for converting the color signal to signals in a color space having three signals including a luminance signal, a hue signal and a chroma signal, tone converting means for performing tone conversion on the luminance signal, correction coefficient calculating means for calculating a chroma correction coefficient to be used for performing correction on the chroma signal, maximum chroma calculating means for calculating a first maximum chroma value in the color space with respect to the luminance signal from the color space converting means and the hue signal from the color space converting means and a second maximum chroma value in the color space with respect to the luminance signal converted by the tone converting means and the hue signal from the color space converting means, and chroma correcting means for performing correction on the chroma signal based on the first maximum chroma value, the second maximum chroma value and the chroma correction coefficient.

According to another aspect of the present invention, there is provided an image pickup system for tone converting and outputting a color signal of a primary color or a color signal of a complementary color from an image pickup apparatus, the system including color space converting means for converting the color signal to signals in a color space having three signals including a luminance signal, a hue signal and a chroma signal, tone converting means for performing tone conversion on the luminance signal, correction coefficient calculating means for calculating a hue correction coefficient to be used for correcting the hue signal with respect to the hue signal in a predetermined range and for calculating a chroma correction coefficient to be used for correcting the chroma signal with respect to the hue signal in the predetermined range, maximum chroma calculating means for calculating a first maximum chroma value in the color space with respect to the luminance signal from the color space converting means and the hue signal from the color space converting means and a second maximum chroma value in the color space with respect to the luminance signal converted by the tone converting means and the hue signal corrected by using the hue correction coefficient, and chroma correcting means for performing correction on the chroma signal based on the first maximum chroma value, the second maximum chroma value and the chroma correction coefficient.

According to another aspect of the invention, there is provided an image pickup system for tone converting and outputting a color signal of a primary color or a color signal of a complementary color from an image pickup apparatus, the system including color space converting means for converting the color signal to signals in a color space having three signals including a luminance signal, a hue signal and a chroma signal, tone converting means for performing tone conversion on the luminance signal, first correction coefficient calculating means for calculating a first chroma correction coefficient to be used for performing correction on the chroma signal, second correction coefficient calculating means for calculating a hue correction coefficient to be used for correcting the hue signal with respect to the hue signal in a predetermined range and for calculating a second chroma correction coefficient to be used for correcting the chroma signal with respect to the hue signal in the predetermined range, maximum chroma calculating means for calculating a first maximum chroma value in the color space with respect to the luminance signal from the color space converting means and the hue signal from the color space converting means and a second maximum chroma value in the color space with respect to the luminance signal converted by the tone converting means and the hue signal corrected by using the hue correction coefficient, and chroma correcting means for performing correction on the chroma signal based on the first maximum chroma value, the second maximum chroma value, the first chroma correction coefficient and the second chroma correction coefficient.

According to another aspect of the invention, there is provided an image processing program causing a computer to function as color space converting means for converting a color signal of a primary color or a color signal of a complementary color to signals in a color space having three signals including a luminance signal, a hue signal and a chroma signal, tone converting means for performing tone conversion on the luminance signal, correction coefficient calculating means for calculating a chroma correction coefficient to be used for performing correction on the chroma signal, maximum chroma calculating means for calculating a first maximum chroma value in the color space with respect to the luminance signal from the color space converting means and the hue signal from the color space converting means and a second maximum chroma value in the color space with respect to the luminance signal converted by the tone converting means and the hue signal from the color space converting means, and chroma correcting means for performing correction on the chroma signal based on the first maximum chroma value, the second maximum chroma value and the chroma correction coefficient.

According to another aspect of the invention, there is provided an image processing program causing a computer to function as color space converting means for converting a color signal of a primary color or a color signal of a complementary color to signals in a color space having three signals including a luminance signal, a hue signal and a chroma signal, tone converting means for performing tone conversion on the luminance signal, correction coefficient calculating means for calculating a hue correction coefficient to be used for correcting the hue signal with respect to the hue signal in a predetermined range and for calculating a chroma correction coefficient to be used for correcting the chroma signal for the hue signal in the predetermined range, maximum chroma calculating means for calculating a first maximum chroma value in the color space with respect to the luminance signal from the color space converting means and the hue signal from the color space converting means and a second maximum chroma value in the color space with respect to the luminance signal converted by the tone converting means and the hue signal corrected by using the hue correction coefficient, and chroma correcting means for performing correction on the chroma signal based on the first maximum chroma value, the second maximum chroma value and the chroma correction coefficient.

According to another aspect of the invention, there is provided an image processing system for causing a computer to function as color space converting means for converting a color signal of a primary color or a color signal of a complementary color to signals in a color space having three signals including a luminance signal, a hue signal and a chroma signal, tone converting means for performing tone conversion on the luminance signal, first correction coefficient calculating means for calculating a first chroma correction coefficient to be used for performing correction on the chroma signal, second correction coefficient calculating means for calculating a hue correction coefficient to be used for correcting the hue signal with respect to the hue signal in a predetermined range and for calculating a second chroma correction coefficient to be used for correcting the chroma signal with respect to the hue signal in the predetermined range, maximum chroma calculating means for calculating a first maximum chroma value in the color space with respect to the luminance signal from the color space converting means and the hue signal from the color space converting means and a second maximum chroma value in the color space with respect to the luminance signal converted by the tone converting means and the hue signal corrected by using the hue correction coefficient, and chroma correcting means for performing correction on the chroma signal based on the first maximum chroma value, the second maximum chroma value, the first chroma correction coefficient and the second chroma correction coefficient.

The above and other objects, features and advantages of the invention will become more clearly understood from the following description referring to the accompanying drawings.

BRIEF DESCRIPTION OF THE DRAWINGS

FIGS. 4A to 4H are line diagrams for describing a modeling of a maximum chroma value of the YCbCr space according to the first embodiment;

FIG. 10 is a block diagram showing a configuration of a maximum chroma calculating portion according to the second embodiment;

FIGS. 11A to 11G are line diagrams for describing a modeling of a maximum chroma value of a Lab space according to the second embodiment.

DETAILED DESCRIPTION OF THE PREFERRED EMBODIMENTS

Embodiments of the present invention will be described below with reference to the drawings.

Figure 1:
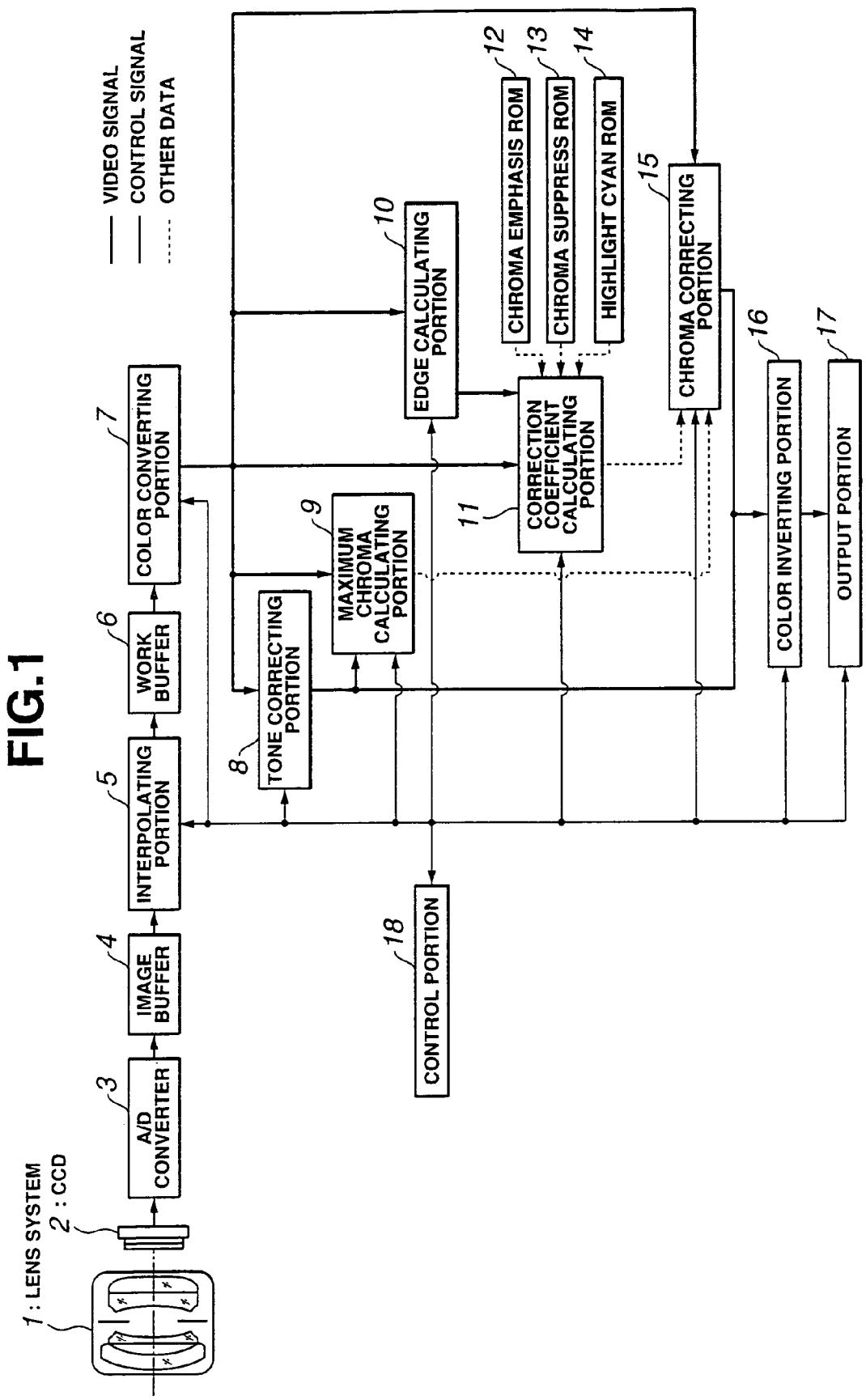
FIG. 1 is a block diagram showing a configuration of an image pickup system according to a first embodiment of the present invention.
Figure 2:
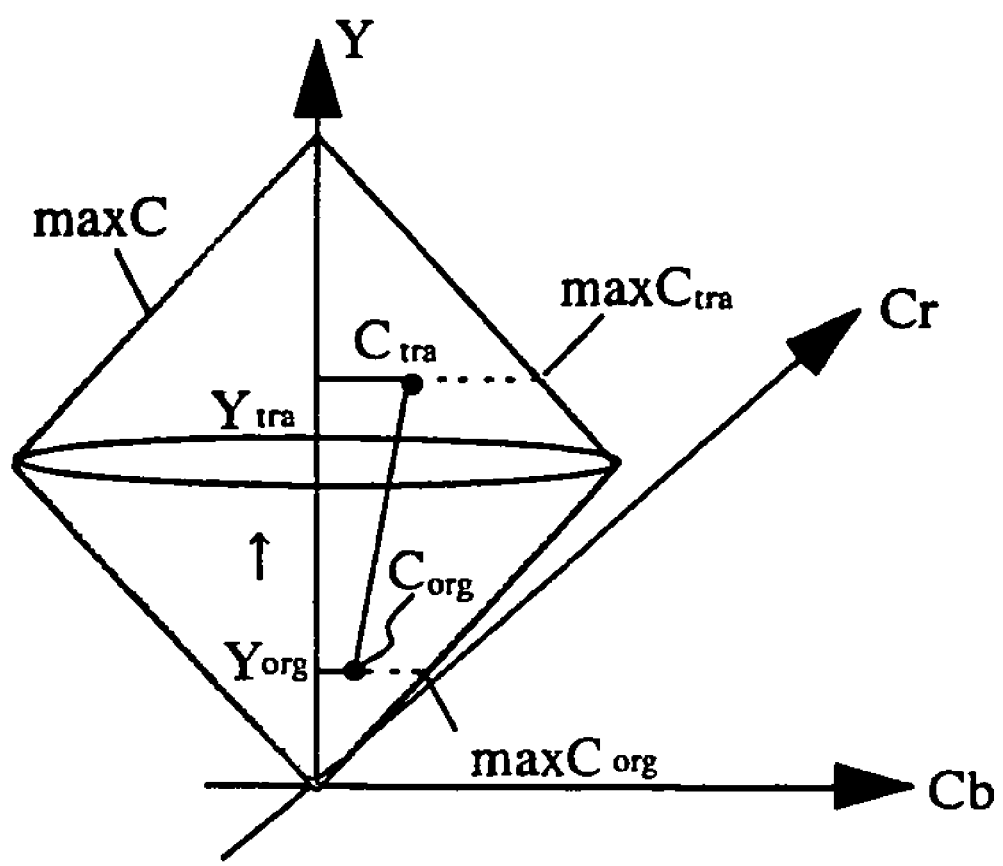
FIG. 2 is a diagram for describing a correction of a chroma signal in a YCbCr color space according to the first embodiment.
Figure 3:
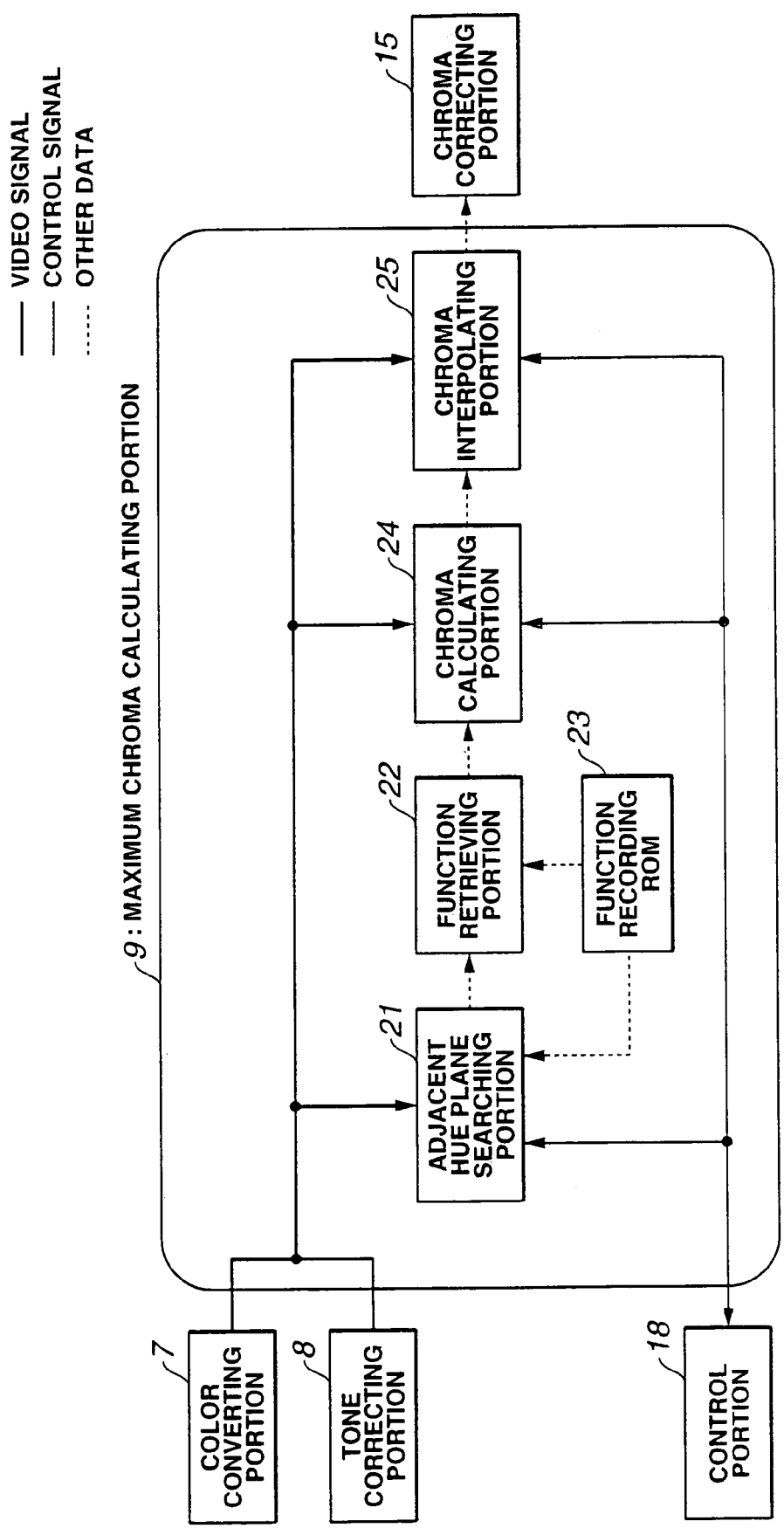
FIG. 3 is a block diagram showing a configuration of a maximum chroma calculating portion according to the first embodiment.
Figure 5A:
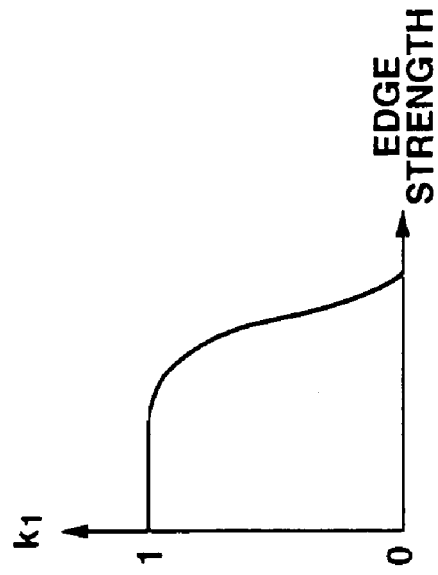
FIGS. 5A to 5C are line diagrams showing different coefficients in a correction coefficient calculating portion according to the first embodiment.
Figure 5B:
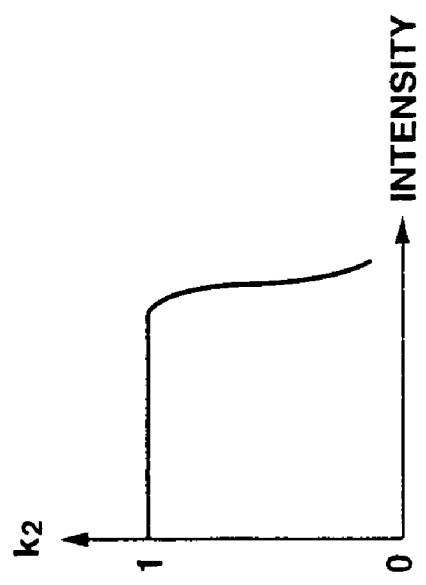
Figure 5C:
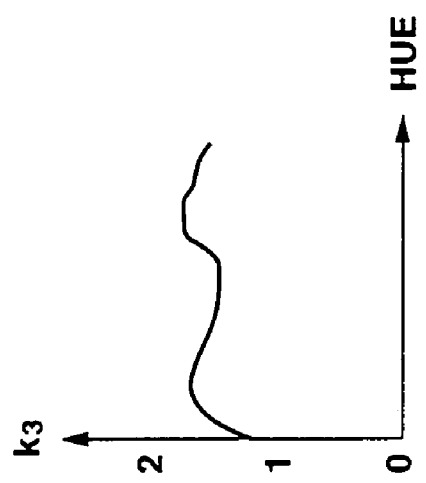
Figure 6:
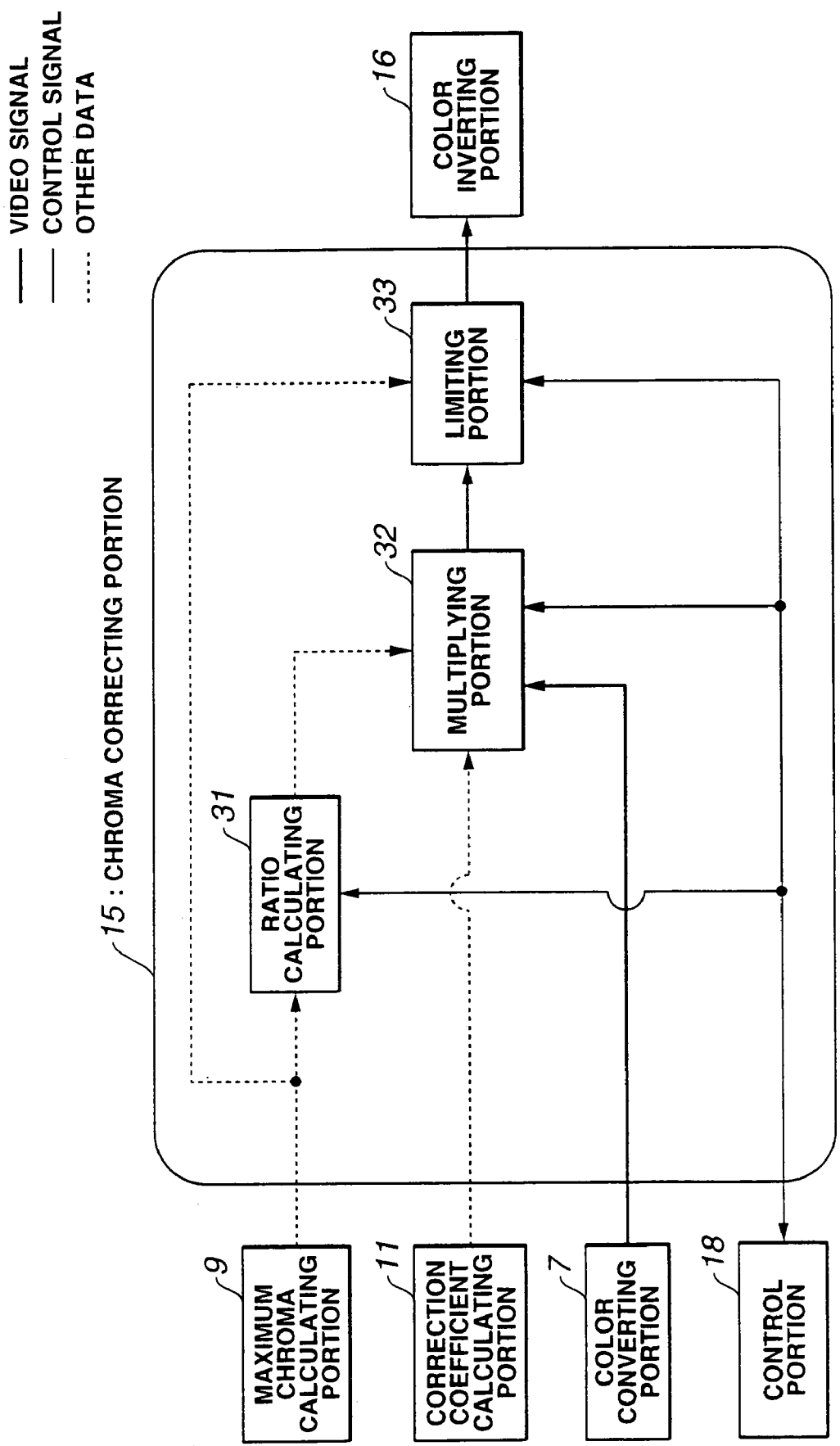
FIG. 6 is a block diagram showing a configuration of a chroma correcting portion according to the first embodiment.
Figure 7:
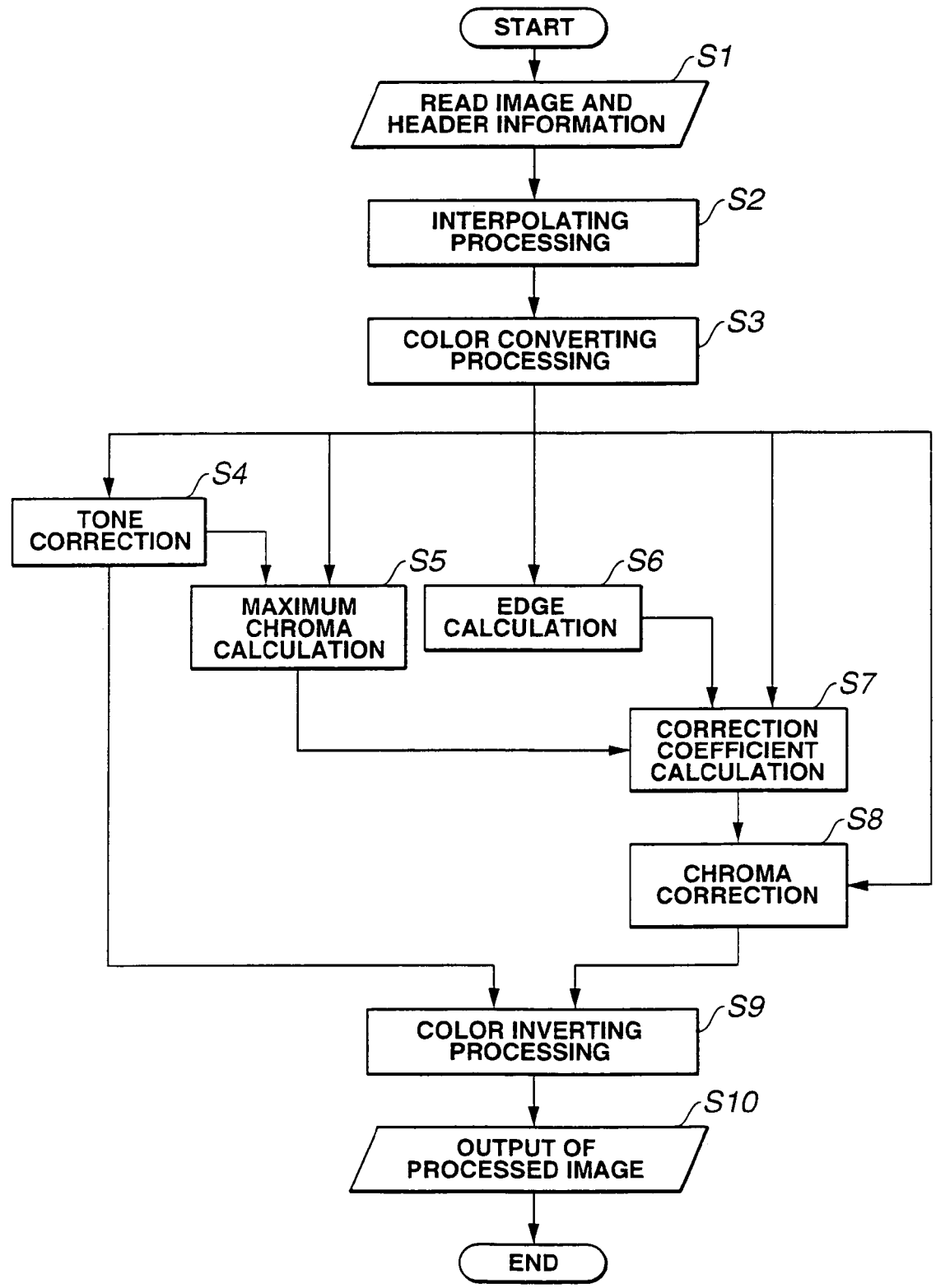
FIG. 7 is a flowchart showing processing for correcting a chroma signal to be performed by an image processing program according to the first embodiment.

FIGS. 1 to 7 illustrate a first embodiment of the present invention. FIG. 1 is a block diagram showing a configuration of an image pickup system. FIG. 2 is a diagram for describing a correction of a chroma signal in a YCbCr color space. FIG. 3 is a block diagram showing a configuration of a maximum chroma calculating portion. FIGS. 4A to 4H are line diagrams for describing a modeling of a maximum chroma value of the YCbCr space. FIGS. 5A to 5C are line diagrams showing different coefficients in a correction coefficient calculating portion. FIG. 6 is a block diagram showing a configuration of a chroma correcting portion. FIG. 7 is a flowchart showing processing for correcting a chroma signal by means of an image processing program.

As shown in FIG. 1, the image pickup system includes a lens system 1, a CCD 2, an A/D converter 3, an image buffer 4, an interpolating portion 5, a work buffer 6, a color converting portion 7, a tone correcting portion 8, a maximum chroma calculating portion 9, an edge calculating portion 10, a correction coefficient portion 11, a chroma emphasis ROM 12, a chroma suppress ROM 13, a highlight cyan ROM 14, a chroma correcting portion 15, a color inverting portion 16, an output portion 17 and a control portion 18.

The lens system 1 forms an object image.

The CCD 2 optoelectronically converts an optical object image formed by the lens system 1 and outputs electric image signals. The CCD 2 is a single plate CCD color image pickup element.

The A/D converter 3 converts analog image signals output from the CCD 2 to digital signals.

The image buffer 4 temporarily stores digital image data output from the A/D converter 3.

The interpolating portion 5 converts single-plate image data stored in the image buffer 4 to 3CCD image data interpolated by a publicly known interpolating method.

The work buffer 6 temporarily stores 3CCD image data interpolated by the interpolating portion 5.

The color converting portion 7 is color-space converting means. The color converting portion 7 converts 3CCD image data stored in the work buffer 6 to signals in a predetermined color space and calculates the intensity, hue and chroma.

The tone correcting portion 8 is tone converting means. The tone correcting portion 8 corrects a luminance signal within the signals in a color space converted by the color converting portion 7 based on a predetermined tone conversion characteristic.

The maximum chroma calculating portion 9 is maximum chroma calculating means. The maximum chroma calculating portion 9 calculates a first maximum chroma value with respect to the luminance signal and hue signal input from the color converting portion 7 and a second maximum chroma value with respect to the luminance signal tone-corrected by the tone correcting portion 8 and an originally input hue signal.

The edge calculating portion 10 receives the originally input luminance signal from the color converting portion 7 and extracts an edge component therefrom.

The chroma emphasis ROM 12 stores a chroma emphasis coefficient (see FIG. 5C), which is a correction coefficient of a chroma in accordance with a hue.

The chroma suppress ROM 13 stores a chroma suppress coefficient (see FIG. 5A), which is a correction coefficient of a chroma in accordance with an edge strength.

The highlight cyan ROM 14 stores a highlight cyan coefficient (see FIG. 5B), which is a correction coefficient of a chroma in accordance with an intensity value.

The correction coefficient calculating portion 11 calculates a correction coefficient to be used for correcting a chroma signal based on the edge strength calculated by the edge calculating portion 10 and the intensity and hue from the color converting portion 7 with reference to the chroma emphasis ROM 12, chroma suppress ROM 13, and highlight cyan ROM 14.

The chroma correcting portion 15 is chroma correcting means. The chroma correcting portion 15 performs a correction by calculating a correction coefficient to be used for correcting a chroma signal by using the first maximum chroma value and second maximum chroma value from the maximum chroma calculating portion 9 and multiplying the correction coefficient and the correction coefficient calculated by the correction coefficient calculating portion 11 by the chroma signal from the color converting portion 7.

The color inverting portion 16 performs a conversion to the YCbCr signals and a conversion to RGB signals based on the luminance signal and hue signal from the tone correcting portion 8 and the chroma signal from the chroma correcting portion 15.

The output portion 17 outputs RGB image data converted by the color inverting portion 16 for recording and storing the resulting RGB image data in a memory card, for example.

The control portion 18 is control means bidirectionally connected to the interpolating portion 5, color converting portion 7, tone correcting portion 8, maximum chroma calculating portion 9, edge calculating portion 10, correction coefficient calculating portion 11, chroma correcting portion 15, color inverting portion 16, and output portion 17 and totally controls the image pickup system including these portions. The control portion 18 includes a microcomputer, for example.

Next, a signal flow in the image pickup system as shown in FIG. 1 will be described.

Video signals captured by the CCD 2 through the lens system 1 are converted to digital signals by the A/D converter 3 and are transferred to the image buffer 4.

According to this embodiment, the CCD 2 in the image pickup system is a primary-colors single plate CCD compliant with an NTSC color television method.

Video signals in the image buffer 4 are transferred to the interpolating portion 5 under the control of the control portion 18 and undergo publicly known interpolating processing. Then, the resulting signals are transferred to the work buffer 6 as RGB 3CCD signals.

Video signals in the work buffer 6 are transferred to the color converting portion 7 under the control of the control portion 18 and are converted to signals in a predetermined color space. According to this embodiment, the color space is a YCbCr color space. The conversion from RGB signals to the YCbCr space is performed based on Equation 1 (EQ1) below:

$$Y = 0.29900R + 0.58700G + 0.11400B$$

$$Cb = -0.16874R - 0.33126G + 0.50000B$$

$$Cr = 0.50000R - 0.41869G - 0.08131B \quad [\text{EQ1}]$$

The color converting portion 7 further calculates a luminance signal V, hue signal H, chroma signal C in the YCbCr color space based on Equation 2 [EQ2] below:

$$V = Y$$

$$H = \tan^{-1}(Cb/Cr)$$

$$C = (Cb^2 + Cr^2)^{1/2} \quad [\text{EQ2}]$$

where $\tan^{-1}$ is the inverse of tan.

As shown in Equation 2, since the luminance signal V is equivalent to Y in the YCbCr color space, a luminance signal is referred to by Y below. Input intensity, hue and chroma signals (that are intensity, hue and chroma signals just output from the color converting portion 7) are referred to by $Y_{org}$, $H_{org}$ and $C_{org}$, respectively.

The luminance signal $Y_{org}$ and hue signal $H_{org}$ from the color converting portion 7 are transferred to the tone correcting portion 8.

The tone correcting portion 8 converts the luminance signal $Y_{org}$ based on a predetermined tone conversion characteristic and obtains a luminance signal $Y_{tra}$. Then, the tone correcting portion 8 transfers the luminance signal $Y_{tra}$ to the maximum chroma calculating portion 9 and the color inverting portion 16. The tone correcting portion 8 further transfers the hue signal $H_{org}$ to the color inverting portion 16.

The maximum chroma calculating portion 9 further receives the transfer of the input luminance signal $Y_{org}$ and originally input hue signal $H_{org}$ from the color converting portion 7.

The maximum chroma calculating portion 9 calculates a first maximum chroma value $\max C_{org}$ of the chroma signal with respect to the input luminance signal $Y_{org}$ and hue signal $H_{org}$ and a second maximum chroma value $\max C_{tra}$ of the chroma signal with respect to the tone-converted luminance signal $Y_{tra}$ and originally input hue signal $H_{org}$.

Then, the first maximum chroma value $\max C_{org}$ and second maximum chroma value $\max C_{tra}$ calculated by the maximum chroma calculating portion 9 are transferred to the chroma correcting portion 15.

The edge calculating portion 10 receives the transfer of the input luminance signal $Y_{org}$ from the color converting portion 7 and performs edge extracting processing by using publicly known Laplacian. Then, the edge calculating portion 10 transfers the edge strength value to the correction coefficient calculating portion 11.

The correction coefficient calculating portion 11 functions as correction coefficient calculating means, first correction coefficient calculating means, second correction coefficient calculating means, chroma suppress means, highlight cyan means and chroma emphasis means. The correction coefficient calculating portion 11 calculates a correction coefficient $k_1$ for chroma suppress processing under the control of the control portion 18 by using the edge strength value transferred from the edge calculating portion 10 with reference to the chroma suppress ROM 13. The chroma suppress processing is processing for multiplying a correction coefficient from 0 to 1 in accordance with the edge strength by a chroma signal in order to reduce a false color occurring at the edge.

FIG. 5A is a line diagram showing a correction coefficient (chroma suppress coefficient) $k_1$ of a chroma in accordance with the edge strength pre-stored in the chroma suppress ROM 13 functioning as the correction coefficient calculating means, the first correction coefficient calculating means and the chroma suppress means.

As shown in FIG. 5A, the chroma suppress coefficient $k_1$ is equal to 1 when the edge strength is equal to or lower than a predetermined value, and the chroma signal does not vary. Then, when the edge strength is equal to or more than the predetermined value, the chroma suppress coefficient $k_1$ decreases mildly toward 0 substantially in proportion to the edge strength. With the chroma suppress coefficient $k_1$, the value of the chroma signal is decreased in accordance with the edge strength.

The correction coefficient calculating portion 11 calculates a correction coefficient $k_2$ for highlight cyan processing under the control of the control portion 18 by using the luminance signal $Y_{org}$ transferred from the color converting portion 7 with reference to the highlight cyan ROM 14. The highlight cyan processing is processing for multiplying a correction coefficient from 0 to 1 in accordance with an intensity value by a chroma signal in order to reduce a false color occurring at a high intensity area.

FIG. 5B is a line diagram showing a chroma correction coefficient (highlight cyan coefficient) $k_2$ in accordance with an intensity value pre-stored in the highlight cyan ROM 14 functioning as the correction coefficient calculating means, the first correction coefficient calculating means and the highlight cyan means.

The highlight cyan coefficient $k_2$ is equal to 1 when the intensity value is equal to or lower than a predetermined value, and the chroma signal does not vary. When the intensity value is equal to or more than the predetermined value, the highlight cyan coefficient $k_2$ decreases comparatively rapidly toward 0. With the highlight cyan coefficient $k_2$, the value of the chroma signal is decreased in accordance with the intensity value.

The correction coefficient calculating portion 11 further calculates a correction coefficient $k_3$ to be used in chroma emphasis processing under the control of the control portion 18. According to this embodiment, a means for performing a different kind of emphasis for each hue is used for calculating the correction coefficient $k_3$ while the correction coefficient $k_3$ can be calculated by various means. Correspondingly, the correction coefficient calculating portion 11 calculates the correction coefficient $k_3$ by using the hue signal $H_{org}$ transferred from the color converting portion 7 by referring to the chroma emphasis ROM 12.

FIG. 5C is a line diagram showing a chroma correction coefficient (chroma emphasis coefficient) $k_3$ in accordance with a hue pre-stored in the chroma emphasis ROM 12 functioning as the correction coefficient calculating means, the first correction coefficient calculating means and the chroma emphasis means.

The chroma emphasis coefficient $K_3$ is a coefficient having a value varying properly in accordance with a hue. In the shown example, the chroma emphasis coefficient $k_3$ varies from 1 to 2 but is not limited thereto.

As described above, the characteristics as shown in FIGS. 5A to 5C are pre-stored in the chroma suppress ROM 13, the highlight cyan ROM 14 and the chroma emphasis ROM 12, respectively, and are read out by the correction coefficient calculating portion 11 as required.

The chroma correcting portion 15 receives a first maximum chroma value $maxC_{org}$ and a second maximum chroma value $maxC_{tra}$ from the maximum chroma calculating portion 9. The chroma correcting portion 15 receives a chroma suppress coefficient $k_1$, a highlight cyan coefficient $k_2$ and a chroma emphasis coefficient $k_3$ from the correction coefficient calculating portion 11. The chroma correction portion 15 further receives a chroma signal $C_{org}$ from the color converting portion 7.

The chroma correcting portion 15 calculates a correction coefficient $k_c$ for a chroma signal with respect to a tone converted luminance signal $Y_{tra}$ under the control of the control portion 18 by using a first chroma value $maxC_{org}$ and a second maximum chroma value $maxC_{tra}$, as shown in Equation 3 (EQ3):

$$k_c = maxC_{tra}/maxC_{org} \quad [EQ3]$$

The chroma correcting portion 15 calculates a corrected chroma signal $C_{tra}$ by multiplying the correction coefficient $K_c$ calculated as described above and correction coefficients $k_1$, $k_2$ and $k_3$ transferred from the correction coefficient calculating portion 11 by the chroma signal $C_{org}$ from the color converting portion 7.

An upper limit is set on the corrected chroma signal $C_{tra}$ in the chroma correcting portion 15 so as not to deviate from the second maximum chroma value $maxC_{tra}$ and is then transferred to the color inverting portion 16.

The color inverting portion 16 calculates YCbCr signals based on the luminance signal $Y_{tra}$ and hue signal $H_{org}$ transferred from the tone correcting portion 8 and the chroma signal $C_{tra}$ transferred from the chroma correcting portion 15 as shown in Equation 4 (EQ4) below:

$$Y = Y_{tra}$$

$$Cb = C_{tra} * \sin(H_{org})$$

$$Cr = C_{tra} * \cos(H_{org}) \quad [EQ4]$$

The color inverting portion 16 further converts YCbCr signals to RGB signals by using Equation 5 (EQ5) below:

$$R = Y + 1.40200 Cr$$

$$G = Y - 0.34414 Cb - 0.71414 Cr$$

$$B = Y + 1.77200 Cb \quad [EQ5]$$

and the resulting RGB signals are transferred to the output portion 17.

The output portion 17 outputs RGB signals output from the color inverting portion 16 to be recorded and stored in a memory card, for example.

Next, an external form of the YCbCr color space and a correction coefficient $k_c$ shown in Equation 3 will be described with reference to FIG. 2.

When the intensity and hue in the YCbCr color space are determined (given as the luminance signal $Y_{org}$ and hue signal $H_{org}$ of an originally input signal in the shown example while the chroma signal of the input signal is $C_{org}$), the possible maximum chroma value $maxC_{org}$ for the range of the luminance signal $Y_{org}$ and hue signal $H_{org}$ is determined.

The maximum chroma value $maxC_{org}$ is a value C of intersection of a half-straight line obtained by extending a segment obtained by connecting a first point at $(Y, H, C) = (Y_{org}, 0, 0)$ and a second point at $(Y, H, C) = (Y_{org}, H_{org}, C_{org})$ toward the second point and the outer edge of the YCbCr color space.

The chroma signal $C_{tra}$ is corrected when the hue is fixed (that is, the hue signal $H_{org}$ output from the color converting portion 7 does not essentially change upon input to the color inverting portion 16) and only the luminance signal $Y_{org}$ is converted to $Y_{tra}$) so as to have a fixed ratio for the maximum chroma value. Thus, natural color reproduction can be achieved.

In other words, when the luminance signal $Y_{tra}$ and hue signal $H_{org}$ are given, the maximum chroma value $maxC_{tra}$ is determined as described above. Therefore, the chroma signal $C_{tra}$ for achieving natural color reproduction needs to satisfy a relationship below:

$$C_{org} : maxC_{org} = C_{tra} : maxC_{tra}$$

that is, $$C_{tra} = (maxC_{tra} / maxC_{org}) \times C_{org}$$

$$= k_C \times C_{org}$$

Thus, a correction because of the change in luminance signal can be performed by multiplying the chroma signal $C_{org}$ by the correction coefficient $k_c$ shown in Equation 3.

Next, a more detailed configuration example of the maximum chroma calculating portion 9 will be described with reference to FIG. 3.

The maximum chroma calculating portion 9 includes an adjacent hue plane searching portion 21, a function retrieving portion 22, a function recording ROM 23, a chroma calculating portion 24 and a chroma interpolating portion 25.

The adjacent hue plane searching portion 21 is searching means for searching in the function recording ROM 23, which will be described later, two hues adjacent to the hue signal $H_{org}$ from the color converting portion 7.

The function retrieving portion 22 is retrieving means for reading out, for example, a parameter of a function corresponding to the two hues from the adjacent hue plane searching portion 21 from the function recording ROM 23, which will be described later.

The function recording ROM 23 is recording means for storing in advance parameters of functions for modeling maximum chroma values of multiple hue planes in the YCbCr space.

The chroma calculating portion 24 is calculating means for calculating a maximum chroma value relating to the two hues based on the luminance signal $Y_{org}$ from the color converting portion 7 or the luminance signal $Y_{tra}$ from the tone correcting portion 8 and a parameter from the function retrieving portion 22.

The chroma interpolating portion 25 is interpolating means for interpolating and obtaining a maximum chroma value with respect to the hue signal $H_{org}$ from the color converting portion 7 by using the maximum chroma value relating to the two hues, which is calculated by the chroma calculating portion 24 and transferring the resulting maximum chroma value to the chroma correcting portion 15.

The control portion 18 is bidirectionally connected to and controls the adjacent hue plane searching portion 21, the chroma calculating portion 24 and the chroma interpolating portion 25.

Here, with reference to FIGS. 4A to 4H, function information will be described which relates to the maximum chroma value maxC of the YCbCr color space recorded in the function recording ROM 23.

FIGS. 4A to 4F are diagrams showing sections of chroma signals C and luminance signals Y on hue planes of red (R), magenta (Ma), blue (B), cyan (Cy), green (G) and yellow (Ye) in the YCbCr color space. FIG. 4G is a diagram showing an arrangement of the hue planes in the CbCr plane. FIG. 4H is a diagram for describing the calculation of the maximum chroma value maxC through interpolation.

By using an intensity $T_i$ (where i=R, Ma, B, Cy, G or Ye) (where Ma, Cy and Ye are abbreviated as M, C and Y in the shown subscripts, for example, as required) corresponding to the maximum chroma value in each of the hue planes as a threshold value, the maximum chroma value $maxC_i$ is modeled by using a high intensity function with respect to a part where the intensity Y is equal to or more than the intensity Ti and by using a low intensity function with respect to a part where the intensity Y is equal to or lower than the intensity $T_i$. The high intensity function and the low intensity function have the same chroma value $maxC_1$ at the intensity $T_i$. Here, a primary function is used in the YCbCr color space as a function for the maximum chroma value maxC as shown in Equation 6 (EQ6) below:

$$maxC_i = \alpha_{hi}Y + \beta_{hi} (Y \geq T_i)$$

$$maxC_i = \alpha_{li}Y + \beta_{li} (Y \leq T_i) \quad [EQ6]$$

The hue $H_i$, intensity $T_i$, which is a threshold value, the high intensity function parameters $\alpha_{hi}$ and $\beta_{hi}$ and the low intensity function parameters $\alpha_{li}$ and $\beta_{li}$ are stored in the function recording ROM 23 in advance.

Next, an operation of the maximum chroma calculating portion 9 will be described as shown in FIG. 3.

Under the control of the control portion 18, the adjacent hue plane searching portion 21 reads out a hue signal $H_i$ recorded in the function recording ROM 23 and compares the read hue signal $H_i$ with the hue signal $H_{org}$ from the color converting portion 7.

Then, as shown in FIG. 4H, the adjacent hue plane searching portion 21 searches two hue signals $H_j$ and $H_k$ (where j and k=R, Ma, B, Cy, G and Ye and J≠k) nearest across the hue signal $H_{org}$ and transfers the two hues to the function retrieving portion 22.

The function retrieving portion 22 retrieves and transfers to the chroma calculating portion 24 the intensities $T_j$ and $T_k$ corresponding to the two hues from the function recording ROM 23, the high intensity function parameters $\alpha_{hj}$ and $\beta_{hj}$ and $\alpha_{hk}$ and $\beta_{hk}$ and the low intensity function parameters $\alpha_{lj}$ and $\beta_{lj}$ and $\alpha_{lk}$ and $\beta_{lk}$.

The chroma calculating portion 24 calculates the maximum chroma values $maxC_{org\_j}$ and $maxC_{org\_k}$ or $maxC_{tra\_j}$ and $maxC_{tra\_k}$ relating to the two hue signals $H_j$ and $H_k$ based on the parameters from the function retrieving portion 22 and the luminance signal $Y_{org}$ from the color converting portion 7 or the luminance signal $Y_{tra}$ from the tone correcting portion 8.

In subsequent steps, the two maximum chroma values are referred by $maxC_j$ and $maxC_k$ so as to be common for both of the luminance signal $Y_{org}$ from the color converting portion 7 and the luminance signal $Y_{tra}$ from the tone correcting portion 8. The maximum chroma value $maxC_j$ and $maxC_k$ calculated by the chroma calculating portion 24 are transferred to the chroma interpolating portion 25.

As shown in FIG. 4H, the chroma interpolating portion 25 calculates through interpolation, a maximum chroma value maxC with respect to the hue signal $H_{org}$ from the color converting portion 7 under the control of the control portion 18 by using the maximum chroma values $maxC_j$ and $maxC_k$ and Equation 7 (EQ7) below:

$$maxC = maxC_j(H_{org} - H_k)/(H_j - H_i) + maxC_k(H_j - H_{org})/(H_i - H_k) \quad [EQ7]$$

where the hues have a relationship $H_j > H_{org} > H_k$.

The calculation of the maximum chroma value by using Equation 7 is performed for the luminance signal $Y_{org}$ from the color converting portion 7 and for the luminance signal $Y_{tra}$ from the tone correcting portion 8, which means that two calculations are performed in total. Thus, a first maximum chroma value $maxC_{org}$ and a second maximum chroma value $maxC_{tra}$ are calculated.

The resulting first maximum chroma value $maxC_{org}$ and second maximum chroma value $maxC_{tra}$ are transferred from the chroma interpolating portion 25 to the chroma correcting portion 15.

Next, a more detail configuration example of the chroma correcting portion 15 will be described with reference to FIG. 6.

The chroma correcting portion 15 includes a ratio calculating portion 31, a multiplying portion 32 and a limiting portion 33.

The ratio calculating portion 31 is ratio calculating means for calculating a correction coefficient $k_c$ as shown in Equation 3 based on the first maximum chroma value $maxC_{org}$ and second chroma value $maxC_{tra}$ transferred from the chroma interpolating portion 25 of the maximum chroma calculating portion 9.

The multiplying portion 32 is multiplying means for calculating a chroma signal $C_{tra}$ corrected by multiplying the correction coefficient $k_c$ calculated by the ratio calculating portion 31 and the correction coefficients $k_1$, $k_2$ and $k_3$ from the correction coefficient calculating portion 11 by the chroma signal $C_{org}$ from the color converting portion 7.

The limiting portion 33 functions as limiting means, replacing means and nonlinear compressing means. The limiting portion 33 limits the chroma signal $C_{tra}$ calculated by the multiplying portion 32 so as to be kept under the second chroma value $maxC_{tra}$ calculated by the maximum chroma calculating portion 9. Then, the limiting portion 33 transfers the limited chroma signal $C_{tra}$ to the color inverting portion 16.

Here, the limiting portion 33 includes the replacing means for replacing the chroma signal $C_{tra}$ by the second maximum chroma value $maxC_{tra}$ when the chroma signal $C_{tra}$ having the coefficients multiplied by the multiplying portion 32 deviates from the second maximum chroma value $maxC_{tra}$.

As described with reference to FIG. 12, according to a second embodiment, which will be described later, the limiting portion 33 may have the nonlinear compressing means for, when the chroma signal $C_{tra}$ having the coefficient multiplied by the multiplying portion 32 exceeds a predetermined threshold value lower than the second chroma value $maxC_{tra}$, converting the chroma signal $C_{tra}$ to a value between the second maximum chroma value $maxC_{tra}$ and the threshold value.

The limiting portion 18 is bidirectionally connected to and controls the ratio calculating portion 31, the multiplying portion 32 and the limiting portion 33.

In the description above, it is assumed that the processing is performed by hardware. However, it is not limited thereto, but the processing may be performed by software.

For example, video signals output from the CCD 2 is left unprocessed and is handled as Raw data. Then, filter information, image size information and so on are added to the Raw data as header information. The Raw data having the header information is output to a processor such as a computer. Then, the Raw data may be processed by different software in the processor.

An example of processing for correcting a chroma signal by using an image processing program in a computer will be described with reference to FIG. 7.

Once the processing starts, video signals having RAW data and header information including information such as filter information and image size information are read out first of all (step S1).

Next, the single plate CCD color signal read as Raw data is interpolated, and 3CCD color signals are generated (step S2).

As shown in Equations 1 and 2, the 3CCD color signals are converted to a luminance signal, a hue signal and a chroma signal (step S3).

Furthermore, the luminance signal is converted based on a predetermined tone conversion characteristic, and the converted luminance signal is transferred to a step S5, which will be described later. The converted luminance signal and the originally input hue signal are transferred to a step S9, which will be described later (step S4).

Subsequently, two maximum chroma values with respect to the input luminance signal and hue signal and two maximum chroma values with respect to the tone-converted luminance signal and the input hue signal are calculated as shown in Equation 7 and are transferred to a step S7, which will be described later (step S5).

An edge strength is extracted from the input luminance signal and is transferred to the next step S7 (step S6).

A correction coefficient $k_c$ shown in Equation 3 is calculated based on the two maximum chroma values from the step S5. A chroma suppress coefficient $k_1$ is calculated based on the edge strength from the step S6 by using a function as shown in FIG. 5A. A highlight cyan coefficient $k_2$ is calculated based on the luminance signal from the step S3 by using a function as shown in FIG. 5B. A chroma emphasis coefficient $k_3$ is calculated based on the hue signal from the step S3 by using a function as shown in FIG. 5C. Then, the correction coefficient $k_c$, chroma suppress coefficient $k_1$, highlight cyan coefficient $k_2$ and chroma emphasis coefficient $k_3$ are transferred to a next step S8 (step S7).

The coefficient coefficients calculated in the step S7 are multiplied by the chroma signal from the step S3, and an upper limit is set on the corrected chroma signal so as not to deviate from the second maximum chroma value $maxC_{tra}$. Then, the resulting corrected chroma signal is transferred to a next step S9 (step S8).

Calculations as shown in Equations 4 and 5 are performed by using the converted luminance signal and originally input hue signal from the step S4 and the corrected chroma signal from the step S8, and processing for returning to the original color signal is performed (step S9).

Then, the processed signals are output (step S10), and the series of the steps ends.

In the description above, a single plate CCD for primary colors system is assumed. However, it is not limited thereto but the present invention can be applied to an image pickup system using a 2CCD or a 3CCD. The CCD is not limited to the one for the primary colors but may be for complementary colors.

A primary function is used as a function of a maximum chroma value recorded in the function recording ROM 23 but is not limited thereto. However, in accordance with a required accuracy, any functions such as a polynomial function, a power function and a spline function may be used.

Here, the hue planes to be functionized are six hue planes of red (R), magenta (Ma), blue (B), cyan (Cy), green (G) and yellow (Ye) but are not limited thereto. For example, in order to put first priority on reducing costs, three hue planes of red (R), blue (B) and green (G) may be used. Alternatively, in order to put first priority on enhancing accuracy, twelve hue planes further have middle hue planes of the six hue planes. Any arrangements can be adopted in accordance with applications and/or purposes.

According to the first embodiment with the above-described construction, picture creating processing and/or correction processing can be performed so as not to cause unnatural color signals even when only the luminance signal is manipulated independently from chroma signals and so on in a color space. Thus, the freedom relating to picture creation can be improved, and desired images can be obtained.

Since the correction processing, emphasis processing and so on may be performed on chroma signals integrally, the costs can be reduced while the speed of the processing can be increased.

Furthermore, when a luminance signal is changed by a tone correction, the chroma signal is corrected so as to achieve a fixed ratio for a theoretical characteristic value of a gamut. Thus, natural color reproduction can be achieved.

Since a YCbCr color space is used which can be easily converted and inverted, a fast and low-cost image pickup system can be constructed.

In addition, since maximum chroma values are stored in a form of function, the capacity of a recording ROM can be saved. Thus, the costs can be reduced.

The maximum chroma values are functionized by using a primary function with respect to hue planes of red, green, blue, cyan, magenta and yellow each having a large amount of variation in maximum chroma value. Then, the functions are separated between those for high intensity and for low intensity based on the variation in form. Thus, the chroma signal can be corrected with high accuracy by using fewer parameters.

Furthermore since a limit is set such that the chroma signal may not deviate from a second maximum chroma value, the chroma signal after different kinds of correction does not deviate from the gamut. Thus, undamaged images can be obtained. Here, the chroma signal having a value beyond a second maximum chroma value is replaced by the one having the second maximum value. Thus, the processing is simplified. As a result, the cost can be reduced, and the speed of processing can be increased.

Since correction coefficients relating to chroma signals are collectively calculated, the cost can be reduced and the speed of the processing can be increased at the same time.

Figure 8:
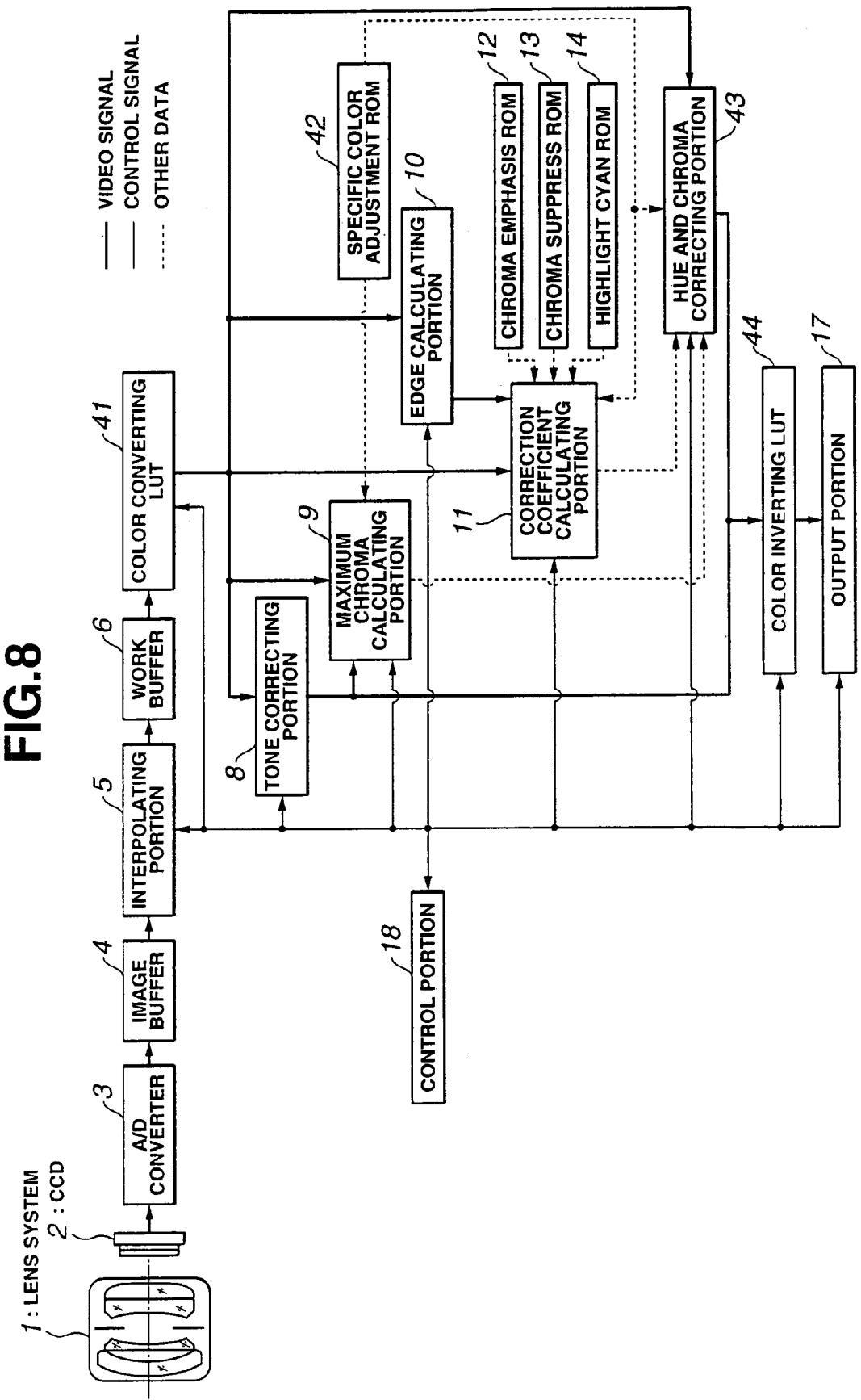
FIG. 8 is a block diagram showing a configuration of an image pickup system according to a second embodiment of the present invention.
Figure 12:
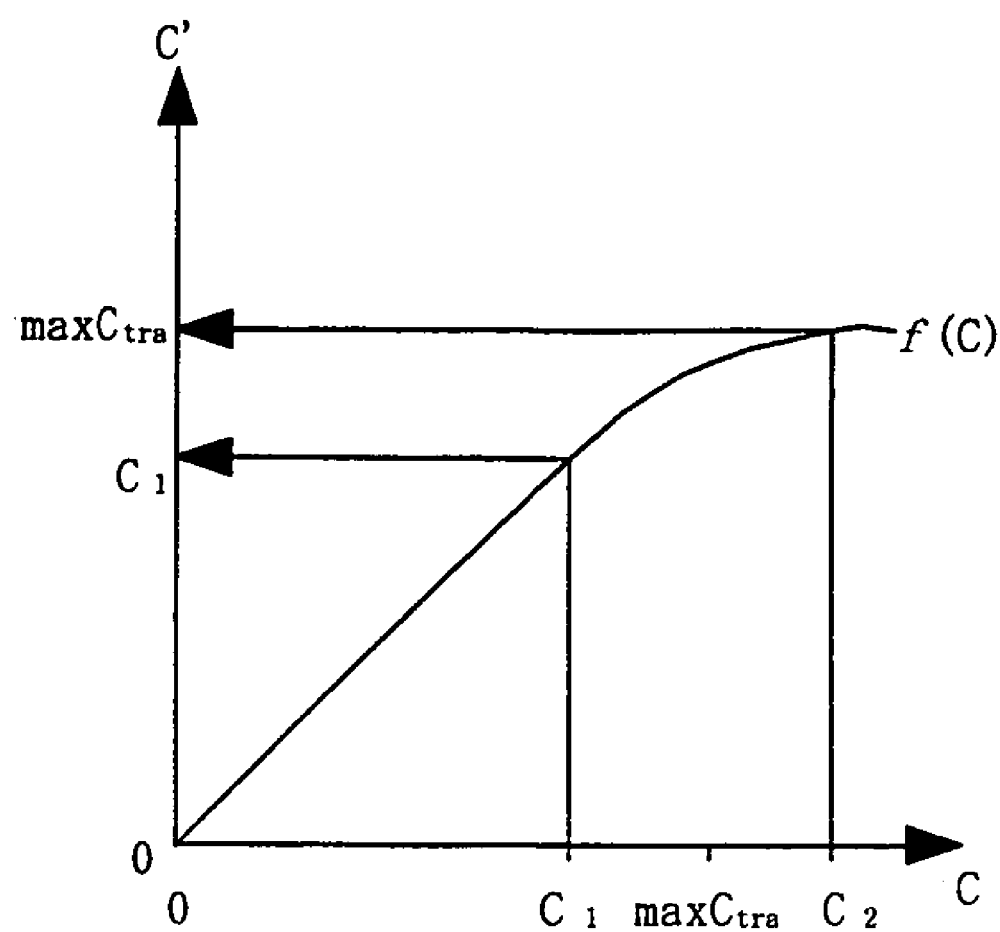
FIG. 12 is a line diagram showing a weight function used by a limiting portion of a chroma correcting portion according to the second embodiment.

FIGS. 8 to 12 show a second embodiment of the present invention. FIG. 8 is a block diagram showing a configuration of an image pickup system. FIGS. 9A and 9B are line diagrams for describing adjustment of a specific color. FIG. 10 is a block diagram showing a configuration of a maximum chroma calculating portion. FIGS. 11A to 11G are line diagrams for describing modeling of a maximum chroma value in a Lab space. FIG. 12 is a line diagram showing a weight function used in a control portion of a chroma correcting portion.

In the description of the second embodiment, the same reference numerals are given to the same components as those of the first embodiment, and the description thereof will be omitted. Only differences therebetween will be described below.

As shown in FIG. 8, in an image pickup system according to the second embodiment, the color converting portion 7 in the construction of the first embodiment is replaced by a color conversion LUT 41, which is color space converting means. The chroma correcting portion 15 in the construction of the first embodiment is replaced by hue and chroma correcting portion 43, which is chroma correcting means. The color inverting portion 16 in the construction of the first embodiment is replaced by a color inversion LUT 44. Furthermore, according to the second embodiment, a specific color adjustment ROM 42 which is correction coefficient calculating means and second correction coefficient calculating means is added to the construction according to the first embodiment. The rest of the basic construction is the same as that of the image pickup system according to the first embodiment.

The color conversion LUT 41 receives video signals transferred from the work buffer 6 and converts the video signals from the RGB signals to a CIE Lab color space. Thus, a luminance signal V, hue signal H and chroma signal C in the CIE Lab color space are calculated, and the calculation result is transferred to the tone correcting portion 8, maximum chroma calculating portion 9, edge calculating portion 10, correction coefficient calculating portion 11 and hue and chroma correcting portion 43.

The specific color adjustment ROM 42 pre-stores a hue correction coefficient for a specific color and transfers the hue correction coefficient to the maximum chroma calculating portion 9, correction coefficient calculating portion 11 and hue and chroma correcting portion 43.

The correction coefficient calculating portion 11 calculates the correction coefficients $k_1$, $k_2$ and $k_3$ and further calculates a correction coefficient $k_s$ to be used for performing chroma correction on a specific color based on the specific color adjustment ROM 42.

The hue and chroma correcting portion 43 calculates a correction coefficient $k_c$ based on a first maximum chroma value $maxC_{org}$ transferred from the maximum chroma calculating portion 9 and a second maximum chroma value $maxC_{tra}$. The hue and chroma correcting portion 43 further calculates a chroma signal $C_{tra}$ which is corrected and on which an upper limit is set by multiplying a chroma signal $C_{org}$ from the color conversion LUT 41 by the different kinds of correction coefficients by using the correction coefficients $k_1$, $k_2$, $k_3$ and $k_s$ from the correction coefficient calculating portion 11. The hue and chroma correcting portion 43 further calculates a hue signal $H_{tra}$ resulting from the correction of the hue signal $H_{org}$ from the color conversion LUT 41 for a specific color based on the specific color adjustment ROM 42. These calculation results are transferred to the color inversion LUT 44.

The color inversion LUT 44 calculates RGB signals based on the luminance signal $Y_{tra}$ from the tone correcting portion 8 and the chroma signal $C_{tra}$ and hue signal $H_{tra}$ from the hue and chroma correcting portion 43 and transfers the result to the output portion 17.

The control portion 18 is bidirectionally connected to and controls the color conversion LUT 41, hue and chroma-correcting portion 43 and color inversion LUT 44.

Next, a signal flow in the image pickup system as shown in FIG. 8 will be described. Since the signal flow in the image pickup system is basically the same as that of the first embodiment, only differences therebetween will be described.

Video signals stored in the work buffer 6 are sequentially transferred to the color conversion LUT 41 under the control of the control portion 18.

The color conversion LUT 41 is a look-up table created based on a publicly known Color Management System (CMS) technology. The color conversion LUT 41 collectively performs first processing for performing conversion from RGB signals to a CIE Lab color space and second processing for calculating a luminance signal V, hue signal H and chroma signal C in the Lab color space by using Equation 8 [EQ8] below:

$$V=L$$

$$H=\tan^{-1}(b/a)$$

$$C=(a^2+b^2)^{1/2} \qquad [EQ8]$$

where $\tan^{-1}$ is the inverse of tan for the above-described reason.

As shown in Equation 8, since the luminance signal V is equivalent to the L in the Lab color space, L refers to the luminance signal below. Furthermore, $L_{org}$, $H_{org}$ and $C_{org}$ refer to originally input intensity, hue and chroma signals, respectively.

The luminance signal $L_{org}$ from the color conversion LUT 41 is transferred to the tone correcting portion 8.

The tone correcting portion 8 calculates a luminance signal $L_{tra}$ by converting the luminance signal $L_{org}$ based on a predetermined tone conversion characteristic and transfers the result to the maximum chroma calculating portion 9 and the color inversion LUT 44.

The maximum chroma calculating portion 9 receives the transfer of the originally input luminance signal $L_{org}$ and the input hue signal $H_{org}$ from the color conversion LUT 41 and further receives the transfer of a hue correction coefficient for a specific color from the specific color adjustment ROM 42.

Figure 9A:
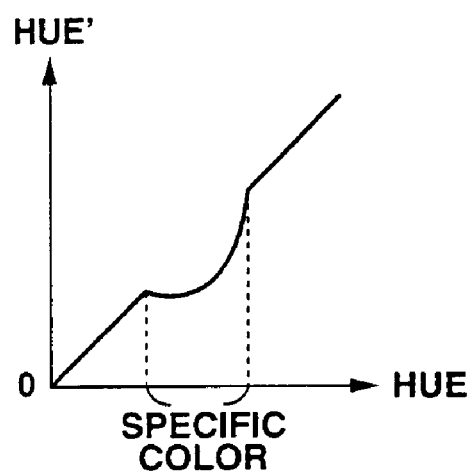
FIGS. 9A and 9B are line diagrams for describing an adjustment of a specific color according to the second embodiment.

FIG. 9A is a line diagram showing a characteristic example for correcting a hue of a specific color stored in the specific color adjustment ROM 42.

As shown in FIG. 9A, only the area having a hue for a specific color (such as a skin-color and a sky color specifically) is adjusted. The other hue area for non-specific colors has an independent characteristic.

The maximum chroma calculating portion 9 calculates a hue signal $H_{tra}$ resulting from the correction of the hue signal $H_{org}$ by using the characteristic as shown in FIG. 9A stored in the specific color adjustment ROM 42.

The maximum chroma calculating portion 9 calculates a first maximum chroma value $maxC_{org}$ with respect to the originally input luminance signal $L_{org}$ and hue signal $H_{org}$ and a second maximum chroma value $maxC_{tra}$ with respect to a tone-converted luminance signal $L_{tra}$ and a hue signal $H_{tra}$ resulting from the correction with respect to a specific color.

The first chroma value $maxC_{org}$ and second maximum chroma value $maxC_{tra}$ calculated by the maximum chroma calculating portion 9 are transferred to the hue and chroma correcting portion 43.

Like the first embodiment, the correction coefficient calculating portion 11 calculates correction coefficients $k_1$, $k_2$ and $k_3$. The correction coefficient $k_1$ used for chroma suppress processing is calculated based on an edge strength value having been transferred from the edge calculating portion 10 and the chroma suppress ROM 13. The correction coefficient $k_2$ used for highlight cyan processing is calculated based on a luminance signal $Y_{org}$ and the highlight cyan ROM 14. The correction coefficient $k_3$ used for chroma emphasis processing is calculated based on a hue signal $H_{org}$ and the hue emphasis ROM 12.

Figure 9B:
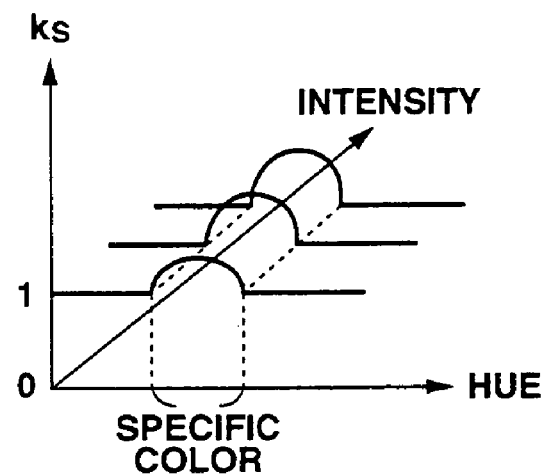

Further, the correction coefficient calculating portion 11 calculates a correction coefficient $k_s$ to be used for performing chroma correction on a specific color based on the luminance signal $Y_{org}$ and, hue signal $H_{org}$ and the characteristic as shown in FIG. 9B stored in the specific color adjustment ROM 42.

FIG. 9B is a line diagram showing a characteristic example to be used for correcting a chroma signal of a specific color, which is stored in the specific color adjustment ROM 42.

In the example shown in FIG. 9B, the correction coefficient $k_s$ for the chroma signal is larger than 1 with respect to only the hue area for a specific color. The other hue area for non-specific colors has the correction coefficient $k_s$ equal to 1 and is free from influences. Multiple curves each showing such a characteristic are prepared, and a different correction coefficient is used for each intensity level. Here, for the medium intensity level of the intensity level which already has the characteristic curve, a correction coefficient interpolated from the characteristic curve of the adjacent intensity level may be naturally used.

The correction coefficient $k_s$ for the chroma signal of the specific color may be produced in consideration of the correction coefficient $k_3$ used for chroma emphasis processing. Alternatively, for the hue of a specific color, the correction coefficient $k_3$ used for chroma emphasis processing may be 1.

The correction coefficients $k_1$, $k_2$, $k_3$ and $k_s$ resulting from the calculations by the correction coefficient calculating portion 11 are transferred to the hue and chroma correcting portion 43.

The hue and chroma correcting portion 43 calculates a correction coefficient $k_c$ for a chroma signal corresponding to the tone-converted luminance signal $L_{tra}$ based on the first maximum chroma value $maxC_{org}$ and second maximum chroma value $maxC_{tra}$ transferred from the maximum chroma calculating portion 9. By multiplying a chroma signal $C_{org}$ by the calculated $k_C$ and correction coefficients $k_1$, $k_2$, $k_3$ and $k_s$, the corrected chroma signal $C_{tra}$ is obtained.

Like the first embodiment, an upper limit is set on the chroma signal $C_{tra}$ corrected by the hue and chroma correcting portion 43 so as not to deviate from the second maximum chroma value $maxC_{tra}$. Then, the resulting chroma signal $C_{tra}$ is transferred to the color inversion LUT 44.

The hue and chroma correcting portion 43 also calculates a hue signal $H_{tra}$ resulting from the correction of a hue signal relating to a specific color based on the specific color adjustment ROM 42. Then, the hue and chroma correcting portion 43 transfers the calculated hue signal $H_{tra}$ to the color inversion LUT 44.

The color inversion LUT 44 is a look up table to be used for obtaining RGB signals from a luminance signal, hue signal and chroma signal. The color inversion LUT 44 obtains RGB signals based on the luminance signal $Y_{tra}$ from the tone correcting portion 8 and the chroma signal $C_{tra}$ and hue signal $H_{tra}$ from the hue and chroma correcting portion 43 and transfers the resulting RGB signals to the output portion 17.

The output portion 17 outputs the RGB signals output from the color inversion LUT 44 to be recorded and stored in a memory card, for example.

Next, referring to FIG. 10, a configuration example of the maximum chroma calculating portion 9 will be described.

The maximum chroma calculating portion 9 has a chroma reading portion 51 and a maximum chroma LUT 52.

The maximum chroma LUT 52 is table means and stores information relating to a maximum chroma value maxC in a Lab color space.

The chroma reading portion 51 reads from the maximum chroma LUT 52 a first maximum chroma value $maxC_{org}$ corresponding to a luminance signal $L_{org}$ and hue signal $H_{org}$ from the color conversion LUT 41. The chroma reading portion 51 further reads from the maximum chroma LUT 52 a second maximum chroma value $maxC_{tra}$ corresponding to a hue signal $H_{tra}$ resulting from the correction of the hue signal $H_{org}$ by referring to the specific color adjustment ROM 42 and a luminance signal $L_{tra}$ from the tone correcting portion 8 and transfers the first maximum chroma value $maxC_{org}$ and the second maximum chroma value $maxC_{tra}$ to the hue and chroma correcting portion 43.

The control portion 18 is bidirectionally connected to and controls the chroma reading portion 51.

Subsequently, FIGS. 11A to 11G are line diagrams showing information relating to a maximum chroma value maxC in a Lab color space, which is recorded in the maximum chroma LUT 52.

FIGS. 11A to 11F are diagrams showing sections of chroma signals C and luminance signals L in hue planes of red (R), magenta (Ma), blue (B), cyan (Cy), green (G) and yellow (Ye) in the Lab color space. FIG. 11G is a diagram showing an arrangement of hue planes.

By using an intensity $T_i$ (where i=R, Ma, B, Cy, G or Ye) (where Ma, Cy and Ye are abbreviated as M, C and Y in the shown subscripts, for example, as required) corresponding to the maximum chroma value in each hue plane as a threshold value, the maximum chroma value $maxC_i$ is modeled by using a high intensity function with respect to a part where the intensity L is equal to or more than the intensity Ti and by using a low intensity function with respect to a part where the intensity L is equal to or lower than the intensity $T_i$. The high intensity function and the low intensity function have the same chroma value $maxC_i$ at the intensity $T_i$. Here, a cubic function is used in the Lab color space as a function for the maximum chroma value maxC as shown in Equation 9 (EQ9) below:

$$maxC_i = \alpha_{hi}L^3 + \beta_{hi}L^2 + \gamma_{hi}L + \delta_{hi} (Y \geq T_i)$$

$$maxC_i = \alpha_{li}L^3 + \beta_{li}L^2 + \gamma_{li}L + \delta_{li} (Y \leq T_i)$$ [EQ9]

The maximum chroma value for each hue and intensity is calculated in advance by interpolation calculation like the first embodiment based on the function of Equation 9 and then is recorded in the maximum chroma LUT 52.

The chroma reading portion 51 reads a maximum chroma value $maxC_i$ corresponding to the hue signal and luminance signal from the color conversion LUT 41 and tone correcting portion 8 by referring to the maximum chroma LUT 52 under the control of the control portion 18 and transfers the read maximum chroma value $maxC_i$ to the hue and chroma correcting portion 43.

In the description above, like the first embodiment, the corrected chroma signal $C_{tra}$ is replaced by a second maximum chroma value $maxC_{tra}$ so as not to deviate from the second maximum chroma value $maxC_{tra}$ but is not limited thereto like the first embodiment.

For example, nonlinear compression may be performed by using a function f(C) as shown in FIG. 12. The function f(C) has a characteristic that the same chroma signal is output as the originally input one when the chroma signal is in the range of 0 to C1 while the chroma signal is compressed nonlinearly in the output range of C1 to $maxC_{tra}$ when the chroma signal is over C1 and in the range of C1 to C2. Here, C1 and C2 are threshold values given as predetermined constants and have a relationship, $C1<maxC_{tra}<C2$.

By using the function f(C) having such a characteristic, all of chroma signals beyond the second maximum chroma value $maxC_{tra}$ are not collectively replaced by the second maximum chroma value $maxC_{tra}$. Thus, the gradation reproduction with high chroma can be improved.

According to the second embodiment, the processing is performed by hardware but it is not limited thereto. The processing may be performed by software like the first embodiment.

Also in this case, for example, video signals output from the CCD 2 are left unprocessed as Raw data. Then, filter information, image size information and so on are added to the Raw data as header information. The Raw data having the header information is output to a processor such as a computer and may be processed by different software in the processor.

In the above-described case, the CIE Lab color space is used as a color space but is not limited thereto. Since the color conversion LUT 41 uses a table, a YCbCr color space or any other color spaces may be used like the first embodiment. Here, instead of the use of a table, a function as shown in Equation 9 may be used like the first embodiment.

According to the second embodiment, substantially the same effect can be obtained as that of the first embodiment. Picture creating processing and/or correction processing can be performed even by only manipulating a luminance signal in a color space independently from the chroma signal and so on such that the color signals may not cause unnaturalness. Thus, the freedom relating picture creation can be improved, and desired images can be achieved.

Since the correction processing, specific color adjustment processing for skin color, sky color and so on and emphasis processing may be performed on chroma signals integrally, the costs can be reduced while the speed of the processing can be increased.

Furthermore, when intensity and hue signals vary, the chroma signal is corrected so as to achieve a fixed ratio for a theoretical characteristic value of a gamut. Thus, natural color reproduction can be achieved.

Since a CIE Lab color space is used which can obtain highly accurate luminance signals and color signals, an image in high quality can be achieved.

In addition, since maximum chroma values are stored in a form of table, a maximum chroma value can be calculated fast. Here, the maximum chroma values are calculated by using a cubic function separated between those for high intensity and for low intensity with respect to hue planes of red, green, blue, cyan, magenta and yellow each having a large amount of variation in maximum chroma value. Then, the calculated maximum chroma value is stored in a form of table. Thus, the chroma signal can be corrected with high accuracy by using fewer parameters.

Since a limit is set such that the chroma signal may not deviate from a second maximum chroma value, the chroma signal after different kinds of correction does not deviate from the gamut. Thus, undamaged images can be obtained. Here, the chroma signal having a value beyond a second maximum chroma value is replaced by the second maximum chroma value. Thus, the processing is simplified. As a result, the cost can be reduced, and the speed of processing can be increased. On the other hand, when a chroma signal beyond a predetermined value under the second maximum chroma value is compressed nonlinearly between the predetermined value and the second maximum chroma value, chroma crushing can be reduced. Thus, gradation reproduction can be improved.

Since correction coefficients relating to chroma signals are collectively calculated, the cost can be reduced and the speed of the processing can be increased at the same time.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup system for tone converting and outputting a color signal of a primary color or a color signal of a complementary color from an image pickup apparatus, the system comprising:

color space converting means for converting the color signal to signals in a color space having three signals including a luminance signal, a hue signal and a chroma signal;

tone converting means for performing tone conversion on the luminance signal;

correction coefficient calculating means for calculating a chroma correction coefficient to be used for performing correction on the chroma signal;

maximum chroma calculating means for calculating a first maximum chroma value in the color space with respect to the luminance signal from the color space converting means and the hue signal from the color space converting means and a second maximum chroma value in the color space with respect to the luminance signal converted by the tone converting means and the hue signal from the color space converting means; and chroma correcting means for performing correction on the chroma signal based on the first maximum chroma value, the second maximum chroma value and the chroma correction coefficient.

2. An image pickup system for tone converting and outputting a color signal of a primary color or a color signal of a complementary color from an image pickup apparatus, the system comprising:

color space converting means for converting the color signal to signals in a color space having three signals including a luminance signal, a hue signal and a chroma signal;

tone converting means for performing tone conversion on the luminance signal;

correction coefficient calculating means for calculating a hue correction coefficient to be used for correcting the hue signal with respect to the hue signal in a predetermined range and for calculating a chroma correction coefficient to be used for correcting the chroma signal with respect to the hue signal in the predetermined range;

maximum chroma calculating means for calculating a first maximum chroma value in the color space with respect to the luminance signal from the color space converting means and the hue signal from the color space converting means and a second maximum chroma value in the color space with respect to the luminance signal converted by the tone converting means and the hue signal corrected by using the hue correction coefficient; and chroma correcting means for performing correction on the chroma signal based on the first maximum chroma value, the second maximum chroma value and the chroma correction coefficient.

3. An image pickup system for tone converting and outputting a color signal of a primary color or a color signal of a complementary color from an image pickup apparatus, the system comprising:

color space converting means for converting the color signal to signals in a color space having three signals including a luminance signal, a hue signal and a chroma signal;

tone converting means for performing tone conversion on the luminance signal;

first correction coefficient calculating means for calculating a first chroma correction coefficient to be used for performing correction on the chroma signal;

second correction coefficient calculating means for calculating a hue correction coefficient to be used for correcting the hue signal with respect to the hue signal in a predetermined range and for calculating a second chroma correction coefficient to be used for correcting the chroma signal with respect to the hue signal in the predetermined range;

maximum chroma calculating means for calculating a first maximum chroma value in the color space with respect to the luminance signal from the color space converting means and the hue signal from the color space converting means and a second maximum chroma value in the color space with respect to the luminance signal converted by the tone converting means and the hue signal corrected by using the hue correction coefficient; and chroma correcting means for performing correction on the chroma signal based on the first maximum chroma value, the second maximum chroma value, the first chroma correction coefficient and the second chroma correction coefficient.

4. An image pickup system according to claim 1, wherein the color space converting means uses a YCbCr color space or a CIE Lab color space as a color space.

5. An image pickup system according to claim 1, wherein the correction coefficient calculating means comprises at least one of:

chroma suppress means for calculating a chroma correction coefficient based on an edge strength value calculated from the luminance signal;

highlight cyan means for calculating a chroma correction coefficient based on the luminance signal; and chroma emphasis means for calculating a chroma correction coefficient based on the hue signal.

6. An image pickup system according to claim 3, wherein the first correction coefficient calculating means comprises at least one of:

chroma suppress means for calculating a first chroma correction coefficient based on an edge strength value calculated from the luminance signal;

highlight cyan means for calculating a first chroma correction coefficient based on the luminance signal; and chroma emphasis means for calculating a first chroma correction coefficient based on the hue signal.

7. An image pickup system according to claim 1, wherein the maximum chroma calculating means comprises:

recording means for recording a function for associating a luminance signal and a maximum chroma value for multiple predetermined hue planes;

searching means for searching two nearest hue planes adjacent to the hue signal from multiple hue planes recorded in the recording means;

retrieving means for retrieving functions relating to the two hue planes searched by the searching means from the recording means;

calculating means for calculating two maximum chroma values based on the two functions retrieved by the retrieving means and the luminance signal;

interpolating means for interpolating and obtaining a maximum chroma value with respect to the hue signal from the two maximum chroma values.

8. An image pickup system according to claim 7, wherein the recording means records a high intensity function for associating a luminance signal having a value equal to or higher than a predetermined intensity value and a maximum chroma value, a low intensity function for associating a luminance signal having a value equal to or lower than the predetermined intensity value and the maximum chroma value with respect to each of the multiple predetermined hue planes, and the predetermined intensity, value.

9. An image pickup system according to claim 7, wherein the recording means records at least one of a primary function, a polynomial function, a power function and a spline function as the function.

10. An image pickup system according to claim 7, wherein the recording means includes hue planes of red, green, blue, cyan, magenta and yellow as the multiple predetermined hue planes.

11. An image pickup system according to claim 1, wherein the maximum chroma calculating means comprises table means for recording a maximum chroma value in the color space with respect to the luminance signal and the hue signal.

12. An image pickup system according to claim 1, wherein the chroma correcting means comprises:

ratio calculating means for calculating a ratio between the first maximum chroma value and the second maximum chroma value;

multiplying means for multiplying the chroma signal by the ratio and the chroma correction coefficient; and limiting means for setting a limit such that the chroma signal having been multiplied by the ratio and the chroma correction coefficient by the multiplying means may not deviate from the second maximum chroma value.

13. An image pickup system according to claim 3, wherein the chroma correcting means comprises:

ratio calculating means for calculating a ratio between the first maximum chroma value and the second maximum chroma value;

multiplying means for multiplying the chroma signal by the ratio, the first chroma correction coefficient and the second chroma correction coefficient; and limiting means for setting a limit such that the chroma signal having been multiplied by the ratio, the first chroma correction coefficient and the second chroma correction coefficient by the multiplying means may not deviate from the second maximum chroma value.

14. An image pickup system according to claim 12, wherein the limiting means comprises replacing means for replacing the chroma signal by the second maximum chroma value when the chroma signal from the multiplying means deviates from the second maximum chroma value.

15. An image pickup system according to claim 12, wherein the limiting means comprises nonlinear compressing means for, when the chroma signal from the multiplying means exceeds a predetermined threshold value lower than the second maximum chroma value, converting the chroma signal to a value between the second maximum chroma value and the threshold value.

16. A computer readable medium storing an image processing program, for causing a computer to function as:
    color space converting means for converting a color signal of a primary color or a color signal of a complementary color to signals in a color space having three signals including a luminance signal, a hue signal and a chroma signal;
    tone converting means for performing tone conversion on the luminance signal; correction coefficient calculating means for calculating a chroma correction coefficient to be used for performing correction on the chroma signal;
    maximum chroma calculating means for calculating a first maximum chroma value in the color space with respect to the luminance signal from the color space converting means and the hue signal from the color space converting means and a second maximum chroma value in the color space with respect to the luminance signal converted by the tone converting means and the hue signal from the color space converting means; and
    chroma correcting means for performing correction on the chroma signal based on the first maximum chroma value, the second maximum chroma value and the chroma correction coefficient.

17. A computer readable medium storing an image processing, for causing a computer to function as:
    color space converting means for converting color signal of a primary color or a color signal of a complementary color to signals in a color space having three signals including a luminance signal, a hue signal and a chroma signal;
    tone converting means for performing tone conversion on the luminance signal; correction coefficient calculating means for calculating a hue correction coefficient to be used for correcting the hue signal with respect to the hue signal in a predetermined range and for calculating a chroma correction coefficient to be used for correcting the chroma signal with respect to the hue signal in the predetermined range;
    maximum chroma calculating means for calculating a first maximum chroma value in the color space with respect to the luminance signal from the color space converting means and the hue signal from the color space converting means and a second
    maximum chroma value in the color space with respect to the luminance signal converted by the tone converting means and the hue signal corrected by using the hue correction coefficient; and
    chroma correcting means for performing correction on the chroma signal based on the first maximum chroma value, the second maximum chroma value and the chroma correction coefficient.

18. An image processing system for causing a computer to function as:
    color space converting means for converting a color signal of a primary color or a color signal of a complementary color to signals in a color space having three signals including a luminance signal, a hue signal and a chroma signal;
    tone converting means for performing tone conversion on the luminance signal;
    first correction coefficient calculating means for calculating a first chroma correction coefficient to be used for performing correction on the chroma signal;
    second correction coefficient calculating means for calculating a hue correction coefficient to be used for correcting the hue signal with respect to the hue signal in a predetermined range and for calculating a second chroma correction coefficient to be used for correcting the chroma signal with respect to the hue signal in the predetermined range;
    maximum chroma calculating means for calculating a first maximum chroma value in the color space with respect to the luminance signal from the color space converting means and the hue signal from the color space converting means and a second maximum chroma value in the color space with respect to the luminance signal converted by the tone converting means and the hue signal corrected by using the hue correction coefficient; and
    chroma correcting means for performing correction on the chroma signal based on the first maximum chroma value, the second maximum chroma value, the first chroma correction coefficient and the second chroma correction coefficient.

19. An image pickup system according to claim 2, wherein the color space converting means uses a YCbCr color space or a CIE Lab color space as a color space.

20. An image pickup system according to claim 3, wherein the color space converting means uses a YCbCr color space or a CIE Lab color space as a color space.

21. An image pickup system according to claim 2, wherein the maximum chroma calculating means comprises:
    recording means for recording a function for associating a luminance signal and a maximum chroma value for multiple predetermined hue planes;
    searching means for searching two nearest hue planes adjacent to the hue signal from multiple hue planes recorded in the recording means;
    retrieving means for retrieving functions relating to the two hue planes searched by the searching means from the recording means;
    calculating means for calculating two maximum chroma values based on the two functions retrieved by the retrieving means and the luminance signal;
    interpolating means for interpolating and obtaining a maximum chroma value with respect to the hue signal from the two maximum chroma values.

22. An image pickup system according to claim 3, wherein the maximum chroma calculating means comprises:
    recording means for recording a function for associating a luminance signal and a maximum chroma value for multiple predetermined hue planes;
    searching means for searching two nearest hue planes adjacent to the hue signal from multiple hue planes recorded in the recording means;
    retrieving means for retrieving functions relating to the two hue planes searched by the searching means from the recording means;

calculating means for calculating two maximum chroma values based on the two functions retrieved by the retrieving means and the luminance signal;

interpolating means for interpolating and obtaining a maximum chroma value with respect to the hue signal from the two maximum chroma values.

23. An image pickup system according to claim 21, wherein the recording means records a high intensity function for associating a luminance signal having a value equal to or higher than a predetermined intensity value and a maximum chroma value, a low intensity function for associating a luminance signal having a value equal to or lower than the predetermined intensity value and the maximum chroma value with respect to each of the multiple predetermined hue planes, and the predetermined intensity value.

24. An image pickup system according to claim 22, wherein the recording means records a high intensity function for associating a luminance signal having a value equal to or higher than a predetermined intensity value and a maximum chroma value, a low intensity function for associating a luminance signal having a value equal to or lower than the predetermined intensity value and the maximum chroma value with respect to each of the multiple predetermined hue planes, and the predetermined intensity value.

25. An image pickup system according to claim 21, wherein the recording means records at least one of a primary function, a polynomial function, a power function and a spline function as the function.

26. An image pickup system according to claim 22, wherein the recording means records at least one of a primary function, a polynomial function, a power function and a spline function as the function.

27. An image pickup system according to claim 21, wherein the recording means includes hue planes of red, green, blue, cyan, magenta and yellow as the multiple predetermined hue planes.

28. An image pickup system according to claim 22, wherein the recording means includes hue planes of red, green, blue, cyan, magenta and yellow as the multiple predetermined hue planes.

29. An image pickup system according to claim 2, wherein the maximum chroma calculating means comprises table means for recording a maximum chroma value in the color space with respect to the luminance signal and the hue signal.

30. An image pickup system according to claim 3, wherein the maximum chroma calculating means comprises table means for recording a maximum chroma value in the color space with respect to the luminance signal and the hue signal.

31. An image pickup system according to claim 2, wherein the chroma correcting means comprises:

ratio calculating means for calculating a ratio between the first maximum chroma value and the second maximum chroma value;

multiplying means for multiplying the chroma signal by the ratio and the chroma correction coefficient; and limiting means for setting a limit such that the chroma signal having been multiplied by the ratio and the chroma correction coefficient by the multiplying means may not deviate from the second maximum chroma value.

32. An image pickup system according to claim 31, wherein the limiting means comprises replacing means for replacing the chroma signal by the second maximum chroma value when the chroma signal from the multiplying means deviates from the second maximum chroma value.

33. An image pickup system according to claim 13, wherein the limiting means comprises replacing means for replacing the chroma signal by the second maximum chroma value when the chroma signal from the multiplying means deviates from the second maximum chroma value.

34. An image pickup system according to claim 31, wherein the limiting means comprises nonlinear compressing means for, when the chroma signal from the multiplying means exceeds a predetermined threshold value lower than the second maximum chroma value, converting the chroma signal to a value between the second maximum chroma value and the threshold value.

35. An image pickup system according to claim 13, wherein the limiting means comprises nonlinear compressing means for, when the chroma signal from the multiplying means exceeds a predetermined threshold value lower than the second maximum chroma value, converting the chroma signal to a value between the second maximum chroma value and the threshold value.

* * * * *